US006845962B1

(12) United States Patent
Barron et al.

(10) Patent No.: US 6,845,962 B1
(45) Date of Patent: Jan. 25, 2005

(54) THERMALLY ACTUATED MICROVALVE DEVICE

(75) Inventors: Richard J. Barron, Ann Arbor, MI (US); Kirt R. Williams, Portola Valley, CA (US); E. Nelson Fuller, Manchester, MI (US); Harry A. Hunnicutt, Ann Arbor, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 09/533,893

(22) Filed: Mar. 22, 2000

(51) Int. Cl.[7] .............................................. F16K 31/02
(52) U.S. Cl. ................ 251/129.06; 251/11; 251/129.07; 137/596.16
(58) Field of Search ............................ 137/596, 596.16; 251/11, 30.02, 129.06, 129.07, 129.01; 310/306, 307; 303/119.1, 119.2

(56) References Cited

U.S. PATENT DOCUMENTS

| | | | |
|---|---|---|---|
| 4,434,813 A | 3/1984 | Mon | |
| 4,581,624 A | 4/1986 | O'Connor | |
| 4,628,576 A | 12/1986 | Giachino et al. | |
| 4,647,013 A | 3/1987 | Giachino et al. | |
| 4,821,997 A | 4/1989 | Zdeblick | |
| 4,824,073 A | 4/1989 | Zdeblick | |
| 4,826,131 A | 5/1989 | Mikkor | |
| 4,828,184 A | 5/1989 | Gardner et al. | |
| 4,869,282 A | 9/1989 | Sittler et al. | |
| 4,938,742 A | 7/1990 | Smits | |
| 4,943,032 A | 7/1990 | Zdeblick | |
| 4,959,581 A | 9/1990 | Dantlgraber | |
| 4,966,646 A | 10/1990 | Zdeblick | |
| 5,029,805 A | 7/1991 | Albarda et al. | |
| 5,050,838 A | 9/1991 | Beatty et al. | |
| 5,054,522 A | 10/1991 | Kowanz et al. | |

(List continued on next page.)

FOREIGN PATENT DOCUMENTS

| | | |
|---|---|---|
| WO | WO 9916096 | 4/1999 |
| WO | WO 0014415 | 3/2000 |

OTHER PUBLICATIONS

Noworolski et al., "Process for in–plane and out–of–plane single–crystal–silicon thermal microactuators," Sensors and Actuators A, Elsevier Science S.A., vol. 55, No. 1, (1996) 65–69.

Ayón et al., "Etching Characteristics and Profile Control in a Time Multiplexed ICP Etcher," Proc. Of Solid State Sensor and Actuator Workshop Technical Digest, Hilton Head SC, (Jun. 1998) 41–44.

(List continued on next page.)

Primary Examiner—George L. Walton
(74) Attorney, Agent, or Firm—MacMillan, Sobanski & Todd, LLC

(57) ABSTRACT

A microvalve device for controlling fluid flow in a fluid circuit. The microvalve device comprises a body having a cavity formed therein. The body further has first and second pilot ports placed in fluid communication with the cavity. The body also has first and second primary ports placed in fluid communication with the cavity. Each port is adapted for connection with a designated fluid source. A pilot valve supported by the body is movably disposed in the cavity for opening and closing the first and second pilot ports. An actuator is operably coupled to the pilot valve for moving the pilot valve. A microvalve is positioned by the fluid controlled by the pilot valve. The microvalve is a slider valve having a first end and a second end. The slider valve is movably disposed in the cavity for movement between a first position and a second position. The first end of the slider valve is in fluid communication with the first and second pilot ports when the first and second pilot ports are open. The second end of the slider valve is in constant fluid communication with the first primary port. When moving between the first and second positions, the slider valve at least partially blocks and unblocks the second primary port for the purpose of variably restricting fluid flow between the primary ports.

15 Claims, 26 Drawing Sheets

U.S. PATENT DOCUMENTS

| | | | |
|---|---|---|---|
| 5,058,856 A | * 10/1991 | Gordon et al. ................ 251/11 |
| 5,061,914 A | 10/1991 | Busch et al. |
| 5,064,165 A | 11/1991 | Jerman |
| 5,065,978 A | 11/1991 | Albarda et al. |
| 5,069,419 A | 12/1991 | Jerman |
| 5,074,629 A | 12/1991 | Zdeblick |
| 5,082,242 A | 1/1992 | Bonne et al. |
| 5,096,643 A | 3/1992 | Kowanz et al. |
| 5,131,729 A | 7/1992 | Wetzel |
| 5,133,379 A | 7/1992 | Jacobsen et al. |
| 5,142,781 A | 9/1992 | Mettner et al. |
| 5,161,774 A | 11/1992 | Engelsdorf et al. |
| 5,177,579 A | 1/1993 | Jerman |
| 5,178,190 A | 1/1993 | Mettner |
| 5,179,499 A | 1/1993 | MacDonald et al. |
| 5,180,623 A | 1/1993 | Ohnstein |
| 5,197,517 A | 3/1993 | Perera |
| 5,209,118 A | 5/1993 | Jerman |
| 5,216,273 A | 6/1993 | Doering et al. |
| 5,217,283 A | 6/1993 | Watanabe |
| 5,238,223 A | 8/1993 | Mettner et al. |
| 5,244,537 A | 9/1993 | Ohnstein |
| 5,267,589 A | 12/1993 | Watanabe |
| 5,271,431 A | 12/1993 | Mettner et al. |
| 5,271,597 A | 12/1993 | Jerman |
| 5,309,943 A | 5/1994 | Stevenson et al. |
| 5,325,880 A | 7/1994 | Johnson et al. |
| 5,333,831 A | 8/1994 | Barth et al. |
| 5,355,712 A | 10/1994 | Petersen et al. |
| 5,368,704 A | 11/1994 | Madou et al. |
| 5,375,919 A | 12/1994 | Furuhashi |
| 5,400,824 A | 3/1995 | Gschwendtner et al. |
| 5,417,235 A | 5/1995 | Wise et al. |
| 5,445,185 A | 8/1995 | Watanabe et al. |
| 5,458,405 A | 10/1995 | Watanabe |
| 5,566,703 A | 10/1996 | Watanabe et al. |
| 5,785,295 A | 7/1998 | Tsai |
| 5,909,078 A | 6/1999 | Wood et al. |
| 5,941,608 A | 8/1999 | Campau et al. |
| 5,954,079 A | * 9/1999 | Barth et al. ................... 251/11 |
| 5,955,817 A | 9/1999 | Dhuler et al. |
| 5,970,998 A | 10/1999 | Talbot et al. |
| 5,994,816 A | 11/1999 | Dhuler et al. |
| 6,019,437 A | 2/2000 | Barron et al. |
| 6,023,121 A | 2/2000 | Dhuler et al. |
| 6,038,928 A | 3/2000 | Maluf et al. |
| 6,114,794 A | 9/2000 | Dhuler et al. |

OTHER PUBLICATIONS

Bartha et al., "Low Temperature Etching of Si in High Density Plasma Using $SF_6/O_2$," Microelectronic Engineering, Elsevier Science B.V., vol. 27, (1995) 453–456.

Fung et al., "Deep Etching of Silicon Using Plasma" Proc. Of the Workshop on Micromachining and Micropackaging of Transducers, (Nov. 7–8, 1984) 159–164.

Klaassen et al., "Silicon Fusion Bonding and Deep Reactive Ion Etching; A New Technology for Microstructures," Proc., Transducers 95 Stockholm Sweden, (1995) 556–559.

Linder et al., "Deep Dry Etching Techniques as a New IC Compatible Tool for Silicon Micromachining," Proc,. Transducers, vol. 91, (Jun. 1991) 524–527.

Petersen et al., "Surface Micromachined Structures Fabricated with Silicon Fusion Bonding," Proc. Transducers, vol. 91, (Jun. 92) 397–399.

Yunkin et al., "Highly Anisotropic Selective Reactive Ion Etching of Deep Trenches in Silicon," Microelectronic Enginineering, Elsevier Science B.V., vol. 23, (1994) 373–376.

"Process for in–plane and out–of–plane single–crystal–silicon thermal microactuators"; J. Mark Noworolski, et al.; Sensors and Actuators A 55 (1996); p. 65–69.

IEEE Technical Digest entitled "Compliant Electro–thermal Microactuators", J. Jonsmann, O. Sigmund, S. Bouwstra, Twelfth IEEE International Conference on Micro Electro Mechanical Systems held Jan. 17–21, 1999, Orlando, Florida, pp. 588–593, IEEE Catalog No.: 99CH36291C.

"A Silicon Microvalve For The Proportional Control Of Fluids" by K.R. Williams, N.I. Maluf, E.N. Fuller, R.J. Barron, D.P. Jaeggi, and B.P. van Drieënhuizen, Transducers '99, Proc. $10^{th}$ International Conference on Solid State Sensors and Actuators, held Jun. 7–10, 1999, Sendai, Japan, pp. 18–21.

* cited by examiner

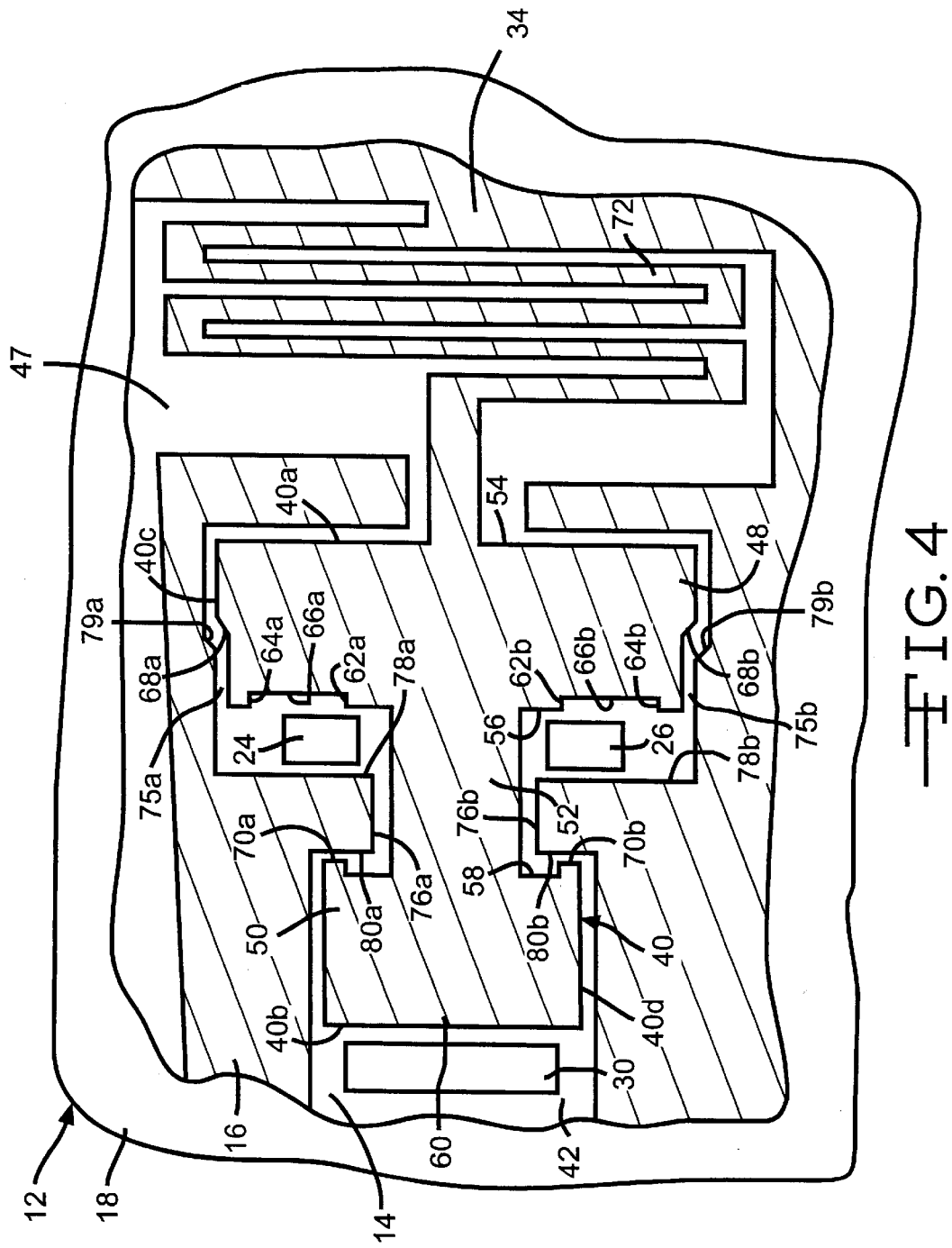

THERMALLY ACTUATED MICROVALVE DEVICE

BACKGROUND OF THE INVENTION

This invention relates in general to semiconductor electromechanical devices, and in particular to a microvalve device having a pilot valve.

MEMS (MicroElectroMechanical Systems) is a class of systems that are physically small, having features with sizes in the micrometer range. These systems have both electrical and mechanical components. The term "micromachining" is commonly understood to mean the production of three-dimensional structures and moving parts of MEMS devices. MEMS originally used modified integrated circuit (computer chip) fabrication techniques (such as chemical etching) and materials (such as silicon semiconductor material) to micromachine these very small mechanical devices. Today there are many more micromachining techniques and materials available. The term "microvalve" as used in this application means a valve having features with sizes in the micrometer range, and thus by definition is at least partially formed by micromachining. The term "microvalve device" as used in this application means a device that includes a microvalve, and that may include other components. It should be noted that if components other than a microvalve are included in the microvalve device, these other components may be micromachined components or standard sized (larger) components.

Various microvalve devices have been proposed for controlling fluid flow within a fluid circuit. A typical microvalve device includes a displaceable member or valve movably supported by a body and operatively coupled to an actuator for movement between a closed position and a fully open position. When placed in the closed position, the valve blocks or closes a first fluid port that is placed in fluid communication with a second fluid port, thereby preventing fluid from flowing between the fluid ports. When the valve moves from the closed position to the fully open position, fluid is increasingly allowed to flow between the fluid ports.

A typical valve consists of a beam resiliently supported by the body at one end. In operation, the actuator forces the beam to bend about the supported end of the beam. In order to bend the beam, the actuator must generate a force sufficient to overcome the spring force associated with the beam. As a general rule, the output force required by the actuator to bend or displace the beam increases as the displacement requirement of the beam increases.

In addition to generating a force sufficient to overcome the spring force associated with the beam, the actuator must generate a force capable of overcoming the fluid flow forces acting on the beam that oppose the intended displacement of the beam. These fluid flow forces generally increase as the flow rate through the fluid ports increases.

As such, the output force requirement of the actuator and in turn the size of the actuator and the power required to drive the actuator generally must increase as the displacement requirement of the beam increases and/or as the flow rate requirement through the fluid ports increases.

Accordingly, there is a need for a microvalve device capable of controlling relatively large flow rates and/or having a displaceable member capable of relatively large displacements with a relatively compact and low powered actuator.

SUMMARY OF THE INVENTION

The invention relates to a microvalve device for controlling fluid flow in a fluid circuit. The microvalve device comprises a body having a cavity formed therein. The body further has first and second pilot ports placed in fluid communication with the cavity. The body also has first and second primary ports placed in fluid communication with the cavity. Each port is adapted for connection with a designated fluid source. In a preferred embodiment, one of the pilot ports and one of the primary ports may be in communication with a common fluid source. A pilot valve supported by the body is movably disposed in the cavity for opening and closing the first and second pilot ports. An actuator is operably coupled to the pilot valve for moving the pilot valve. A microvalve is positioned by the fluid controlled by the pilot valve. The microvalve is a slider valve having a first end and a second end. The slider valve is movably disposed in the cavity for movement between a first position and a second position. The first end of the slider valve is in fluid communication with the first and second pilot ports when the first and second pilot ports are open. The second end of the slider valve is in constant fluid communication with the first primary port. When moving between the first and second positions, the slider valve at least partially blocks and unblocks the second primary port for the purpose of variably restricting fluid flow between the primary ports.

In operation, the actuator controls the placement of the pilot valve. In turn, the placement of the pilot valve controls the fluid pressure acting on the first end of the slider valve. The difference between the fluid forces acting on the ends of the slider valve in turn controls the placement of the slider valve. The placement of the slider valve then controls the degree of fluid flow between the primary ports.

The force required to actuate the pilot valve is relatively small. Consequently, the actuator can be relatively compact with relatively low power requirements. Furthermore, the displacement of the slider valve and the flow rate between the primary ports can be relatively large because the fluid force differential associated with the fluid pressures of the fluid sources acting on the ends of the slider valve can be relatively large.

Various other objects and advantages of this invention will become apparent to those skilled in the art from the following detailed description of the preferred embodiments, when read in light of the accompanying drawings.

BRIEF DESCRIPTION OF THE DRAWINGS

FIG. 4 is an enlarged view of a slider valve of the microvalve device illustrated in FIGS. 1A and 1B shown in an intermediate position.

DETAILED DESCRIPTION OF THE PREFERRED EMBODIMENTS

Figure 1A:
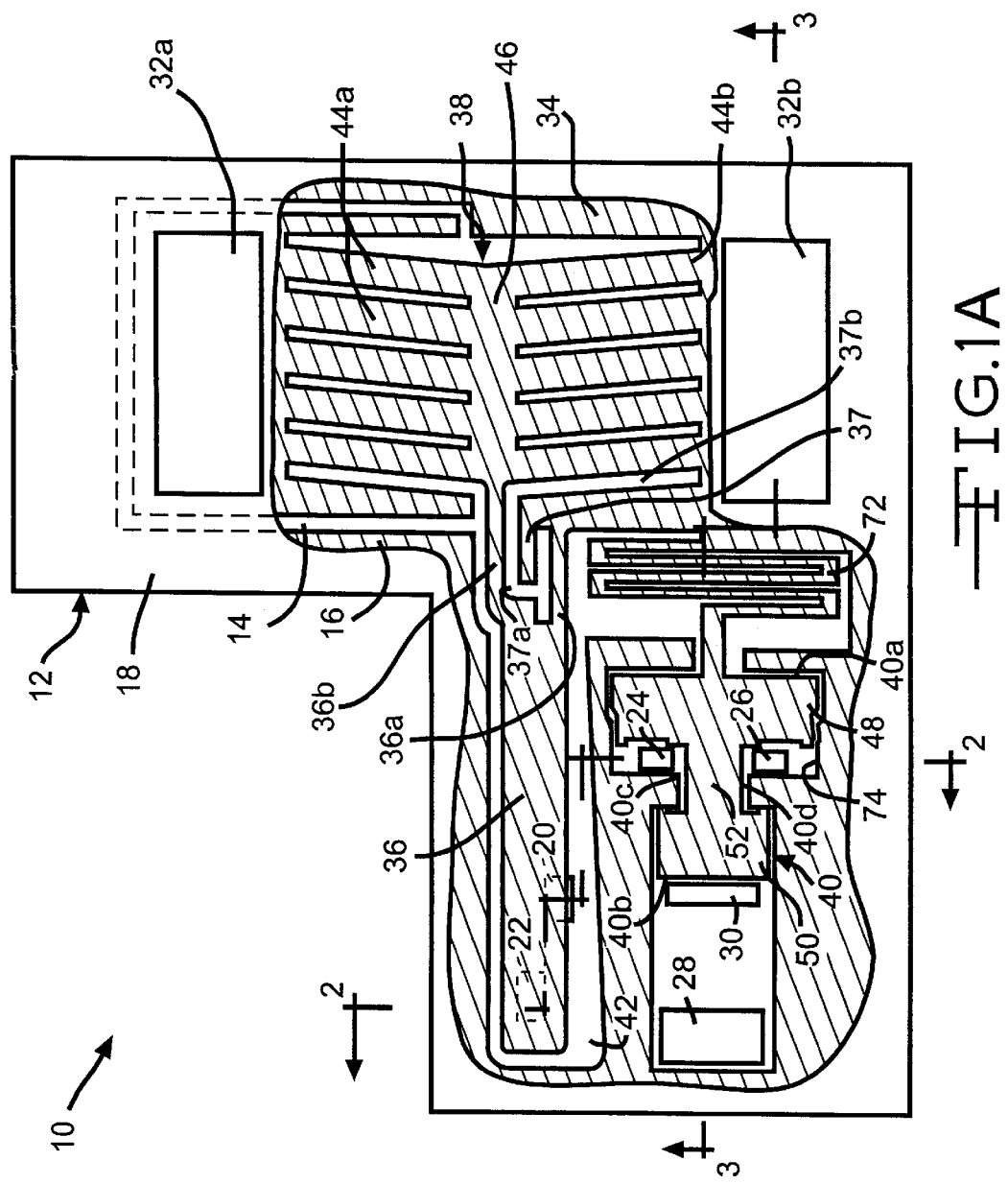
FIG. 1A is a top plan view of a first embodiment of a microvalve device according to this invention partly broken away to show the microvalve device in a first position.
Figure 2:
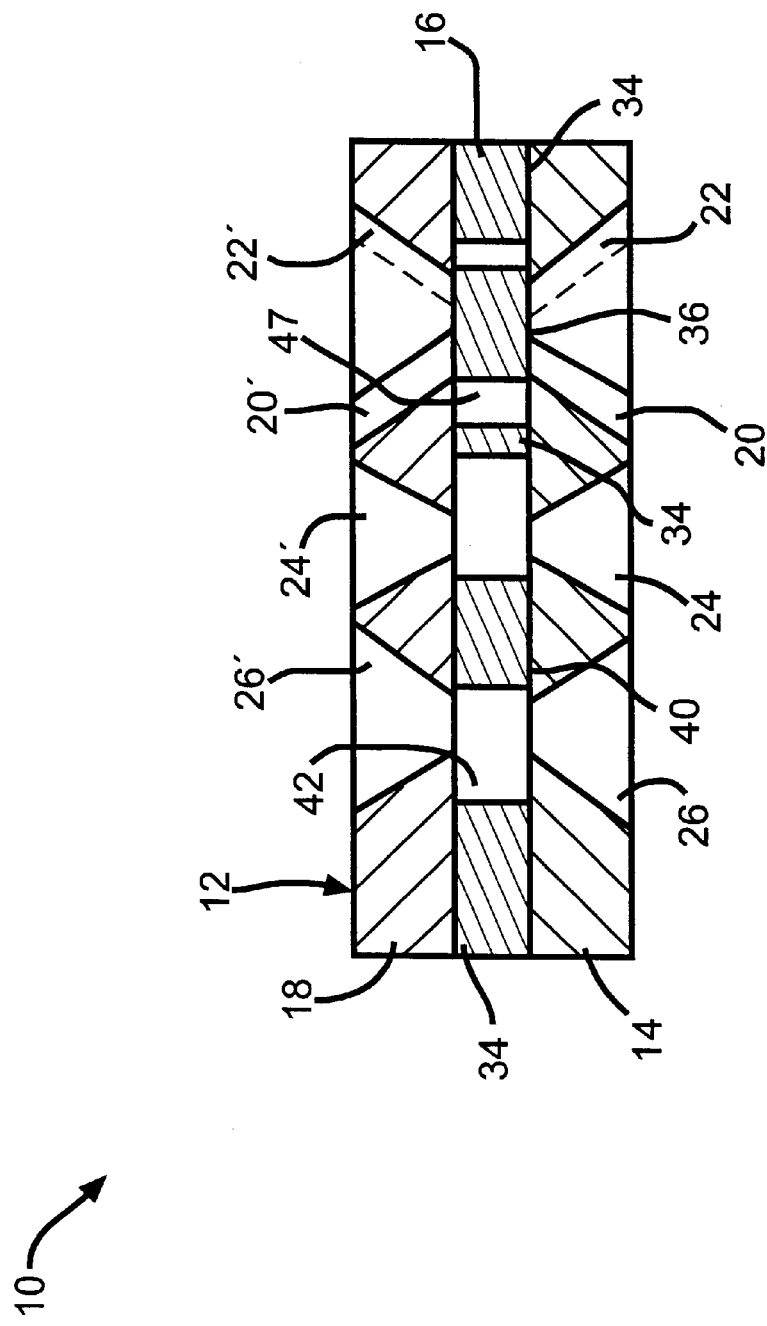
FIG. 2 is a sectional view of the microvalve device taken along the line 2—2 of FIG. 1A.
Figure 3:
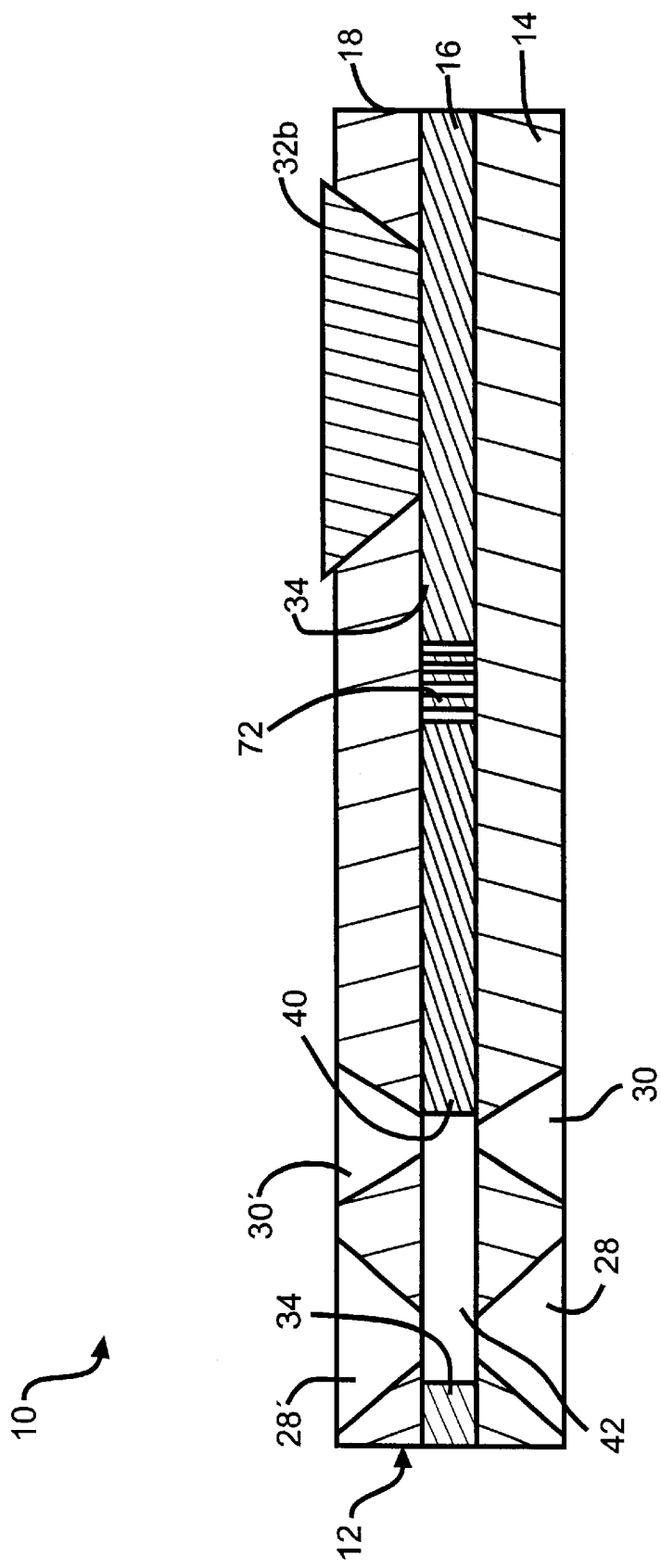
FIG. 3 is a sectional view of the microvalve device taken along the line 3—3 of FIG. 1A.

A first embodiment of a microvalve device for controlling fluid flow in a fluid circuit is shown generally at 10 in FIG. 1A. The microvalve device 10 includes a body indicated generally at 12. The body 12 includes first, second and third plates 14, 16 and 18, respectively, as best shown in FIGS. 2 and 3. The second plate 16 is attached to and between the first and third plates 14, 18. Preferably, each plate 14, 16, 18 is made of semiconductor material, such as silicon. Alternatively, the plates 14, 16, 18 may be made of any other suitable material, such as glass, ceramic, aluminum, or the like. The description regarding the materials of the plates 14, 16, 18 also applies to the alternate embodiments of microvalve devices disclosed below.

It should be understood that the term "fluid source" as used in this application only means a quantity of fluid. The fluid source may be at a relatively "high pressure", such as the discharge of a running pump, in which case fluid will tend to flow from that fluid source to the area of interest. Alternatively, the fluid may be of relatively "low pressure", such as the suction of a running pump, in which case the fluid will tend to flow from the area of interest to the fluid source. The term "non-planar" as used in this application means that the fluid flow, force, or other subject of the term has a significant component acting perpendicular to the parallel planes defined by the plates 14, 16, and 18. Other terms which may be used in this application include upper, lower, above, below, up, down and the like. These terms are defined in this application with respect to an arbitrary frame work in which the direction perpendicular to the second plate 16 toward the first plate 14 is defined as "down" and the direction perpendicular to the second plate 16 toward the third plate 18 is defined as "up". This convention is for ease of discussion and is not intended as a limitation to the orientation of the devices described herein in actual use or as a limitation to the claims. The terms "inner" and "outer" are defined with respect to the relative closeness of the component under discussion to the longitudinal axis generally defined by the assembly (generally a valve) under discussion, with an inner component being relatively closer to the axis than an outer component.

In this disclosure, reference is sometimes made to a valve being "closed" or a port being "covered or "blocked". It should be understood that these terms mean that flow through the valve or the port is reduced sufficiently that any leakage flow remaining will be relatively insignificant in applications in which the microvalve devices described herein should be employed.

Figure 1B:
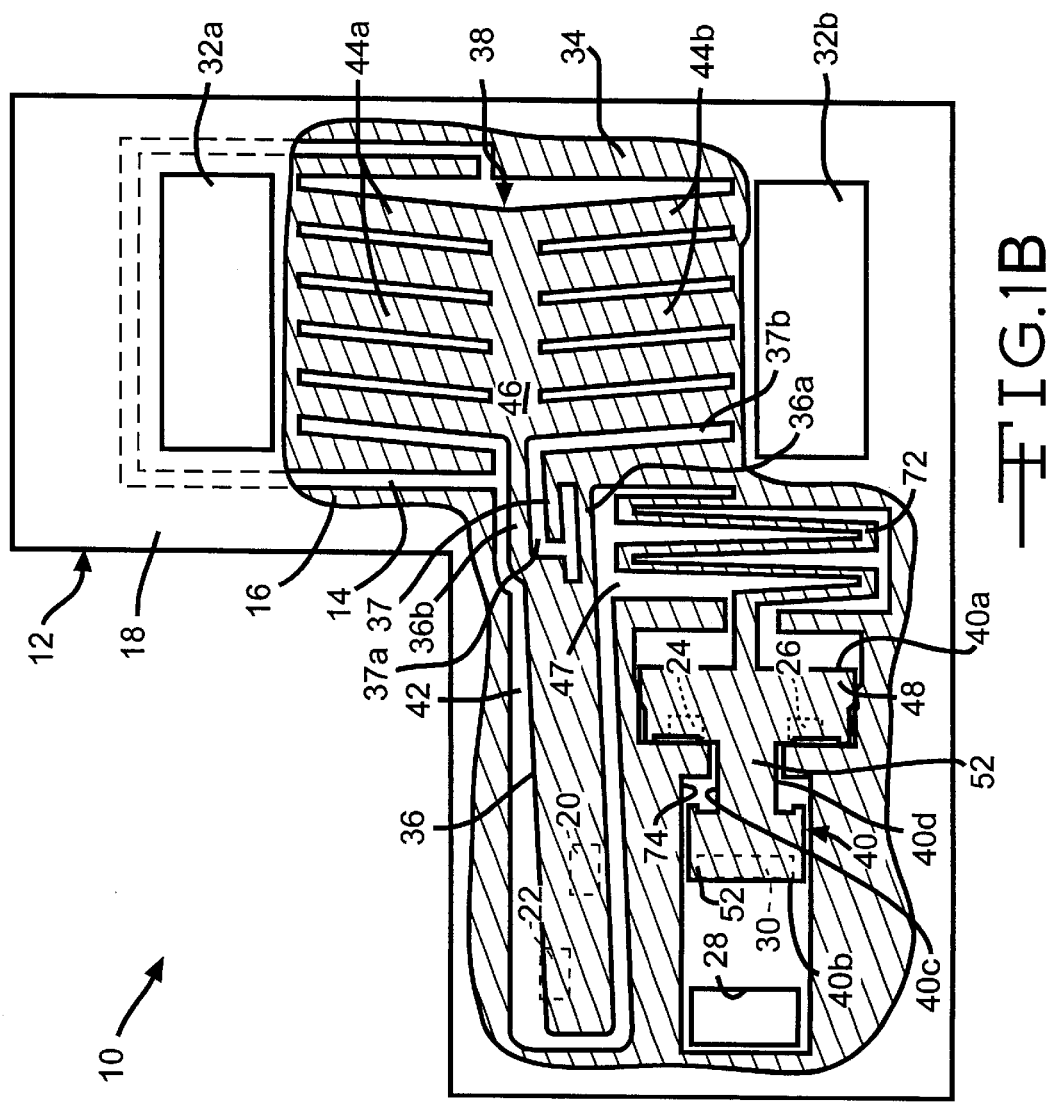
FIG. 1B is a view similar to FIG 1A, except with the microvalve device shown in a second position.

Referring to FIGS. 1A, 1B, and 2, the first plate 14 defines a first pilot port 20 and a second pilot port 22. The first pilot port 20 is adapted for connection with one of a "low pressure" fluid medium or source (not shown) and a "high pressure" fluid medium or source (not shown). The second pilot port 22 is adapted for connection with the other of the "low pressure" fluid source and the "high pressure" fluid source. The first plate 14 also defines a first exhaust port 24 and a second exhaust port 26. Each exhaust port 24, 26 is adapted for connection with a common fluid source (not shown).

Referring also to FIG. 3, the first plate 14 further defines a first primary port 28 and a second primary port 30. The primary ports 28 and 30 are each adapted for connection with a different respective fluid source (not shown).

Referring again to FIG. 2, the third plate 18 defines a first pilot port 20' opposing the first pilot port 20 and a second pilot port 22' opposing the second pilot port 22. The pilot ports 20' and 22' are adapted for connection with the fluid sources associated with the first and second pilot ports 20 and 22, respectively. The third plate 18 also defines a first exhaust port 24' opposing the first exhaust port 24 and a second exhaust port 26' opposing the second exhaust port 26. The exhaust ports 24', 26' are adapted for connection with the fluid source associated with the exhaust ports 24 and 26.

Referring again to FIG. 3, the third plate 18 further defines a first primary port 28' opposing the first primary port 28 and a second primary port 30' opposing the second primary port 30. The primary ports 28' and 30' are adapted for connection with the fluid sources associated with the primary ports 28 and 30, respectively. The purpose of having opposing ports is discussed below.

Additionally, the third plate 18 includes a pair of electrical contacts 32a and 32b disposed in corresponding openings formed in the third plate 18. The electrical contacts 32a, 32b contact the second plate 16 and are adapted for connection to a suitable power source (not shown) for providing an electrical current between the contacts 32a and 32b. The electrical contacts 32a, 32b are illustrated as solder joints, but may be wire leads or the like. Additionally, it should be appreciated that one or both of the electrical contacts 32a and 32b may be placed in the first plate 14.

Referring to FIGS. 1A and 1B, the second plate 16 includes the following main components: a fixed portion 34; a first microvalve embodied as a pilot valve 36 supported by the fixed portion 34 for fully opening and closing the pilot ports 20, 20', 22, 22'; an actuator 38 for moving the pilot valve 36; and a second microvalve embodied as a slider valve 40 for controlling fluid flow between the first primary ports 28, 28' and the second primary ports 30, 30'. These components along with the other components of the second plate 16 are described below.

The microvalve device 10 may have gaps (not shown) between the first and/or third plates 14, 18 and each of the moving elements of the second plate 16 including the pilot valve 36, the actuator 38, and the slider valve 40. These gaps may be formed by thinning the moving elements 36, 38, 40 and/or by forming a recess in the first and third plates 14, 18 adjacent the moving elements 36, 38, 40. The sizes of the gaps formed between the pilot ports 20, 20', 22, 22' and the pilot valve 36 immediately around the pilot ports 20, 20', 22, 22' are small enough to adequately restrict fluid from leaking past the pilot valve 36 when the pilot ports 20, 20', 22, 22' are blocked by the pilot valve 36. Preferably, these gaps are approximately 1 micron in size. Similarly, the sizes of the gaps formed between the slider valve 40 and the associated ports 24, 24', 26, 26', 28, 28', 30, 30' immediately around the associated ports 24, 24', 26, 26', 28, 28', 30, 30' are small enough to adequately restrict fluid from leaking past the slider valve 40 when the associated ports 24, 24', 26, 26', 28, 28', 30, 30' are blocked by the slider valve 40. Preferably, these gaps also are approximately 1 micron in size. The gap sizes of the gaps of all other areas between the first and third plates 14, 18 and the moving elements 36, 38, and 40 are sufficiently large enough to provide free movement of the moving elements 36, 38, and 40. Preferably, these gaps are approximately 10 microns in size.

The fixed portion 34 defines a cavity 42 and is fixedly attached to the first and third plates 14, 16.

The pilot valve 36 is a microvalve formed as an longitudinally elongate beam having an end flexibly attached to the fixed portion 34 by an elongate flexure beam 36a. The flexure beam 36a acts as a hinge for mounting the pilot valve 26 in the cavity 42 of the valve body formed by the first, second, and third plates 14, 16, 18. The flexure beam 36a forms a reduced-width generally longitudinally extending extension of the pilot valve 36. The pilot valve 36 is movably disposed in the cavity 42 for pivotal movement between a first position and a second position, the flexure beam 36a bending as the pilot valve 36 moves. As the pilot valve 36 pivots, it defines a plane within which the pilot valve 36 is moving. Preferably, the pilot valve 36 is of a uniform thickness. Within the plane of movement of the pilot valve 36, the pilot valve 36 defines a first transverse width. The flexure beam 36a defines a second transverse width that is less than said first transverse width. FIGS. 1A and 1B show the pilot valve 36 in the first and second positions, respectively. In the first position, the pilot valve 36 blocks or substantially closes the second pilot ports 22, 22' and unblocks or fully opens the first pilot ports 20, 20'. By opening the first pilot ports 20, 20', the pilot valve 36 provides fluid communication between the first pilot ports 20, 20' and a fluid passage 47 connecting the pilot valve 36 and the slider valve 40. In the second position, the pilot valve 36 unblocks or fully opens the second pilot ports 22, 22' and blocks or substantially closes the first pilot ports 20, 20'. By opening the second pilot ports 22, 22', the pilot valve 36 provides fluid communication between the second pilot ports 22, 22' and the fluid passage 47. As will be more fully described below, during use the pilot valve 36 selectively directs "high pressure" fluid into the fluid passage 47 and selectively vents "high pressure" from the fluid passage 47 to operate the placement of the slider valve 40.

The actuator 38 is operably coupled to the pilot valve 36 via a connecting member 36b for moving the pilot valve 36 between the first and second positions. The connecting member 36b forms an elongate flexure beam defining a third transverse width within the plane of movement of the pilot valve 36, the third transverse width being less than the first transverse width of the pilot valve 36.

The actuator 38 includes multiple pairs of opposing ribs 44a and 44b. Each rib 44a, 44b has a first end and a second end. While the ribs 44a and 44b are shown as being linear and of uniform cross-section along the length thereof, it should be understood that the ribs 44a and 44b may be curved, angled, or of non-uniform cross-section if suitable for a particular application. The first ends of the ribs 44a and 44b are attached to the fixed portion 34 adjacent the electrical contacts 32a and 32b, respectively. The second ends of the ribs 44a, 44b are attached to a spine 46 at respective angles thereto.

Each pair of ribs 44a and 44b are generally at an angle to one another to form a chevron having an apex at the spine 46. When the electrical contacts 32a, 32b are electrically energized, electrical current passes between the electrical contacts 32a, 32b through the ribs 44a, 44b. In turn, the ribs 44a, 44b thermally expand. As the ribs 44a, 44b expand, the ribs 44a, 44b elongate, which in turn causes the spine 46 to be displaced. Accordingly, it is preferable that the ribs 44a, 44b be formed from a conductor or semiconductor material having a suitable thermal expansion coefficient, such as silicon. Additionally, it is preferable that the ribs 44a, 44b, the spine 46 and the fixed portion 34 be integrally formed. By regulating the amount of current supplied through the ribs 44a, 44b, the amount of expansion of the ribs 44a, 44b can be controlled, thereby controlling the amount of displacement of the spine 46. The combination of the number of ribs 44a, 44b and the angle formed between the ribs 44a, 44b and the spine 46 is determinative of the force exerted on the spine 46 and the amount of displacement realized by the spine 46 for a given current supplied.

The connecting member 36b is fixed to the same longitudinal end of the pilot valve as the flexure beam 36a, at a point spaced apart from the supported end of the pilot valve 36 by the flexure beam 36a. The connecting member 36b extends generally parallel to the flexure beam 36a. However, it will be apparent from inspection of FIGS. 1A and 1B, that the connecting member 36b may be said to be slightly "L-shaped", which increases the offset of the line of force provided by the actuator 38 from the hinge provided by the flexure beam 36a to increase the torque provided by the actuator 38 to move the pilot valve 36. Preferably, the pilot valve 36 and the spine 46 are integrally formed. Suitably, the ends of the flexure beam 36a and the connecting member 36b may be formed with divergent roots therein to minimize stress concentration at the ends thereof. This is not shown in FIGS. 1A and 1B; however, in FIGS. 5A and 5B (to be discussed below) a flexure beam 136c has divergent roots 136d and a connecting member 136e has divergent roots 136f at the ends thereof. A fixed rib 37 extends partially between the connecting member 36b and the flexure beam 36a, the flexure beam 36b, the rib 37, and the connecting member 36b cooperating to define a first slot 37a. This facilitates fabrication of the slots fixed rib 37 defines a fourth transverse width that is substantially the same as the second and third widths of the flexure beam 36aand the connecting member 36b. The slot 37a is defined with a generally "u-shaped" portion when viewed in plan from the perspective looking from the pilot valve 36 toward the slot 37a. The slot 37a is preferably extended toward the ribs 44a of the actuator and communicates with a slot 37b defined between one of the ribs 44a and the adjacent fixed portion 34. This facilitates fabrication of the slot 37b and the slot 37a.

When displaced, the spine 46 imparts a force on the pilot valve 36 that produces a moment about the supported end of the pilot valve 36. The moment causes the pilot valve 36 to resiliently bend a first direction about the supported end of the pilot valve 36, which causes the pilot valve 36 to move from the first position to the second position. When the electrical contacts 32a, 32b are de-energized, the ribs 44a, 44b cool and in turn contract. The contraction of the ribs 44a, 44b causes the spine 46 to be displaced in a direction opposite the direction of the displacement of the spine 46 due to the expansion of the ribs 44a, 44b. The displacement of spine 46 due to the contraction of the ribs 44a, 44b bends the pilot valve 36 in a second direction about the supported end of the pilot valve 36, which causes the pilot valve 36 to move from the second position to the first position.

It should be appreciated that the pilot valve 36 may be replaced by any suitable microvalve capable of opening and closing fluid ports. Additionally, the actuator 38 may be replaced by any actuation means suitable for actuating the pilot valve 36 or an appropriate alternative microvalve. Indeed, the pilot valve 36 and the actuator 38 need not be micromachined MEMS devices, although it will normally be advantageous for these to be so for improved packaging and other considerations. The description regarding the pilot valve 36 and actuator 38 alternatives also applies to the alternative embodiments of the microvalve devices disclosed below.

Referring to FIG. 4, the slider valve 40 is a microvalve formed as a generally flat T-shaped member having a pair of opposite ends 40a and 40b and a pair of opposite longitudinally extending sides 40c and 40d. The slider valve 40 is disposed in the cavity 42 for movement between a first, fully open position (shown in FIG. 1A) and a second, closed position (shown in FIG. 1B). It should be appreciated that in certain applications the slider valve 40 may also be placed in an intermediate or biased position as shown in FIG. 4. The intermediate position of the slider valve 40 is a position between the fully open and closed positions of the slider valve 40 and is coincident with the "as fabricated" state of the slider valve 40 relative to the fixed portion 34. The use of the term "as fabricated" is more clearly defined below. During use, the slider valve 40 assumes the intermediate position when the fluid pressure associated with one of the opposing pairs of pilot ports 20, 20', 22, 22' and the fluid pressures of the primary ports 28, 28', 30, 30' and the exhaust ports 24, 24', 26, 26' are substantially equal. An application exemplary of such a condition is discussed below.

The slider valve 40 includes a first portion 48 and a second portion 50 interconnected by an intermediate portion 52. Preferably, the first, the second and the intermediate portions 48, 50, 52 are integrally formed. When the slider valve 40 is placed in the fully open position, the first primary ports 28, 28' are placed in fluid communication with the second primary ports 30, 30', as shown in FIG. 1A. Accordingly, fluid is allowed to flow between the fluid sources associated with the primary ports 28, 28', 30, 30'. When the slider valve 40 is placed in the closed position, the second portion 50 blocks the second primary ports 30, 30', as shown in FIG. 1B. Having blocked the second primary ports 30, 30', the slider valve 40 substantially cuts off fluid communication between the first primary ports 28, 28' and the second primary ports 30, 30'. As a result, fluid is effectively prevented from flowing between the fluid sources associated with the primary ports 28, 28', 30, 30'. When the slider valve 40 is placed in the intermediate position, the second portion 50 unblocks the second primary ports 30, 30', as shown in FIG. 4, thereby allowing fluid flow between the fluid sources associated with the primary ports 28, 28', 30, 30'. Additionally, when moving from the fully open position to the closed position, the first portion 48 increasingly blocks the exhaust ports 24, 24', 26, 26', while the second portion increasingly blocks the second primary ports 30, 30'. When moving from the closed position to the fully open position, the first portion 48 increasingly unblocks the exhaust ports 24, 24', 26, 26', while the second portion increasingly unblocks the second primary ports 30, 30'.

In view of the proximate relationship between the pilot valve 36 and the pilot ports 20, 20', 22, 22' and between the slider valve 40 and the primary ports 28, 28', 30, 30', and the exhaust ports 24, 24', 26, 26' the purpose of having the ports 20, 22, 24, 26, 28, and 30 oppose the ports 20', 22', 24', 26', 28' and 30', respectively, can be more clearly appreciated. Specifically, the pairs of opposing ports provide means of balancing fluid forces that act on the upper and lower surfaces of pilot valve 36 and the slider valve 40. By balancing these forces, neither the pilot valve 36 nor the slider valve 40 are urged by these fluid forces to contact the first plate 14 or the third plate 18, which would otherwise interfere with the movement of the valves 36, 40.

Referring to FIG. 4, the first portion 48 of the slider valve 40 includes a first face 54 and a second face 56 opposite the first face 54. The second portion 50 of the slider valve 40 includes a first face 58 and a second face 60 opposite the first face 58. The first face 54 of the first portion 48 is the end 40a of the slider valve 40 and fluidly communicates with the pilot ports 20, 20', 22, 22' via the passage 47. The second face 60 of the second portion 50 is the end 40b opposite the end 40a. The second face 56 of the first portion 48 and the first face 58 of the second portion 50 oppose each other. Preferably, the intermediate portion 52 divides the second face 56 of the first portion 48 and the first face 58 of the second portion 50 into substantially equal transverse portions. The slider valve 40 is generally of uniform thickness. As such, a comparison of the surface areas of the various faces 54, 56, 58, 60 of the slider valve 40 may be made by a comparison of the length of the various faces 54, 56, 58,

60. It should be appreciated that while the first face 54 and the second face 56 of the first portion 48 are shown to have surface areas greater than the surface areas of the first face 58 and the second face 60 of the second portion 50, respectively, the surface areas of the first face 54 and second face 56 of the first portion 48 may be equal or less than surface areas of the first face 58 and the second face 60 of the second portion 50, respectively.

First pads or inner pads 62a and 62b extend from the second face 56 of the first portion 48. One of each of the inner pads 62a, 62b is directly adjacent one of each of the sides of the intermediate portion 52. Second pads or outer pads 64a and 64b also extend from the second face 56 of the first portion 48. The outer pads 64a and 64b are spaced apart from the inner pads 62a, 62b, respectively, in an outward traverse direction. Preferably, the pads 62a, 62b, 64a, 64b and the first portion 48 are integrally formed. The purposes of the pads 62a, 62b, 64a, 64b are discussed below.

A pocket 66a is defined between the inner and outer pads 62a, 64a. The pocket 66a slightly overlaps the first exhaust ports 24, 24' when the slider valve 40 is in the closed position. As such, the pocket 66a maintains constant fluid communication with the first exhaust ports 24, 24'. The inner pad 62b and the outer pad 64b likewise form a pocket 66b between the inner and outer pads 62b, 64b. The pocket 66b and the second exhaust ports 26, 26' are arranged in a manner that places the pocket 66b in constant fluid communication with the second exhaust ports 26, 26'. The purpose of maintaining fluid communication between the pockets 66a, 66b and the associated exhaust ports 24, 24', 26, 26' is discussed below.

A step 68a is formed in the side 40c of the first portion 48. Similarly, a step 68b is formed in the side 40d of the first portion 48. The steps 68a, 68b divide the first portion 48 into wide and narrow portions. The wide portion is adjacent the first face 54 and the narrow portion is adjacent the second face 56. The purpose of the steps 68a, 68b is discussed below.

The second portion 50 includes third pads 70a and 70b that extend from the first face 58. Each of the third pads 70a, 70b is directly adjacent a respective one of the sides 40c, 40d of the second portion 50. Preferably, the pads 70a, 70b and the second portion 50 are integrally formed. The purpose of the pads 70a, 70b is discussed below.

The second plate 16 also includes a spring 72 interconnecting the slider valve 40 and the fixed portion 34. The spring 72 biases the slider valve 40 toward the intermediate position (shown in FIG. 4). Additionally, the spring 72 may function as an assembly aid. Specifically, the spring 72 may provide a means of holding the slider valve 40 to the fixed portion 34 while the second plate 16 is being bonded to the first and/or third plates 14, 18. The spring 72 is preferably connected between the first face 54 of the first portion 48 and a portion of the fixed portion 34 opposing the first face 54. Alternatively, the spring 72 may be connected between the slider valve 40 and the fixed portion 34 in any desirable arrangement, such as between the second face 60 of the second portion 50 and a portion of the fixed portion 34 opposing the second face 60. The spring 72 is shown formed as tension spring but may be formed as a compression spring. Preferably, the spring 72, the slider valve 40 and the fixed portion 34 are integrally formed. When the spring 72, the slider valve 40, and the fixed portion 34 are integrally formed, the spring 72 is in a relaxed state in the intermediate, biased or "as fabricated" position, as shown in FIG. 4. Accordingly, when displaced from the intermediate position, the spring 72 biases or urges the slider valve to return to the intermediate position (shown in FIG. 4). Alternatively, if the spring 72 is separately formed from the slider valve and/or the fixed portion, the spring 72 may be used to bias the slider valve 40 in the fully open position (shown in FIG. 1A), the closed position (shown in FIG. 1B) or any position between the fully open and closed positions. In applications where the spring 72 is used solely as an assembly aid, the spring 72 may be replaced be a non-spring-like member or detachable tether (not shown) connected between the slider valve 40 and the fixed portion 34. Preferably, the tether includes a notch or other suitable pre-stressed feature, which causes the tether to breakaway from the slider valve 40 or the fixed portion 34 in a predetermined manner after attaching the second plate 16 to the first and third plates 14, 18.

The second plate 16 further includes a sleeve 74 attached to the fixed portion 34 and surrounding at least a portion of the perimeter of the slider valve 40. Preferably, the sleeve 74 and the fixed portion 34 are integrally formed. When the slider valve 40 is in the intermediate position (shown in FIG. 4), a generally uniform passage 75a is defined between the sleeve 74 and the side 40c. Similarly, when the slider valve 40 is in the intermediate position, a generally uniform passage 75b is defined between the sleeve 74 and the side 40d. The passages 75a and 75b allow free movement of the slider valve 40 between the fully open and closed positions by providing clearance between the slider valve 40 and the sleeve 74. In providing a clearance between the slider valve 40 and the sleeve 74, the passages 75 permit fluid communication between the ends 40a and 40b when the slider valve 40 moves from the fully open position toward the closed position and when the slider valve 40 moves from the closed position toward the fully open position between the fully open and closed position. It should be appreciated that in certain applications that fluid flow through the passages may be undesirable if the fluid flow through the passages 75a, 75b exceeds a specified flow rate. Regarding these types of applications, it is preferable that the passages 75a, 75b are sized are small enough to adequately restrict fluid flow between the pilot ports 20, 20', 22, 22' and the associated exhaust ports 24, 24', 26, 26', and between the primary ports 28, 28', 30, 30' and the associated exhaust ports 24, 24', 26, 26'. Generally, it is desirable that the effective restrictions of the passage 75a, 75b between the end 40a and the exhaust ports 24, 24', 26, 26' be greater than the effective restriction of the exhaust ports 24, 24', 26, 26'. Similarly, it is desirable that the effective restrictions of the passage 75a, 75b between the end 40b and the exhaust ports 24, 24', 26, 26' be greater than the effective restriction of the exhaust ports 24, 24', 26, 26'. In other words, it is generally preferable that flow of fluid through the passages 75a, 75b to the exhaust ports 24, 24', 26, 26' is restricted more than the flow of fluid through the exhaust ports 24, 24', 26, 26'.

The sleeve 74 includes a pair of steps 79a and 79b adjacent the steps 68a and 68b of the slider valve 40, respectively. The steps 79a, 79b occur between a relatively wide portion of the cavity 42 and a relatively narrow portion of the cavity 42. The wide portion of the first portion 48 of the slider valve 40 is disposed within the wide portion of the cavity 42 when the slider valve 40 is in the fully open position (shown in FIG. 1A) and the intermediate position (shown in FIG. 4). The wide portion of the first portion 48 of the slider valve 40 is disposed within the narrow portion of the cavity 42 when the slider valve 40 is in the closed position (shown in FIG. 1B). The steps 79a, 79b of the sleeve 74 and the steps 68a, 68b of the first portion 48 of the slider valve 40 cooperate to reduce the clearance between the sides of the first portion 48 and the sleeve 74 when the slider valve 40 moves from the fully open and intermediate positions to the closed position. By reducing the clearance between the sides of the first portion 48 and the sleeve 74, fluid flow between the pilot ports 20, 20', 22, 22' and the exhaust ports 24, 24', 26, 26' through the passages 75a, 75b is greatly restricted. The steps 79a, 79b of the sleeve 74 and the steps 68a, 68b of the first portion 48 of the slider valve 40 are preferably slightly inclined relative to the longitudinal axis of the slider valve 40. This inclined step arrangement facilitates alignment and entry of the wide portion of the first portion 48 into the narrow portion of the cavity 42 as the slider valve 40 moves toward the closed position from the fully open and intermediate positions.

It should be appreciated that the steps 68a, 68b, 79a, 79b are desirable to effectively reduce the clearance between the sides 40c, 40d of the first portion 48 of the slider valve 40 that would otherwise be minimally achievable by known silicon chip etching techniques.

The sleeve 74 further has opposing seats 76a and 76b for limiting the movement of the slider valve 40. The seat 76a extends from the sleeve 74 between the first portion 48 and the second portion 50 of the slider valve 40 and toward the side 40c. Similarly, the seat 76b extends from the sleeve 74 between the first portion 48 and the second portion 50 of the slider valve 40 and toward the side 40d. The seats 76a and 76b have first faces 78a and 78b, respectively, and second faces 80a and 80b, respectively. When the slider valve 40 is placed in the closed position, each inner pad 62a, 62b and each outer pad 64a, 64b engage the first face 78a, 78b of the associated seat 76a, 76b. By engaging the seats 76a, 76b, the inner and outer pads 62a, 62b, 64a, 64b prevent the slider valve 40 from moving beyond the closed position when moving from the intermediate and the fully open positions. Additionally, engagement between the seats 76a, 76b and the inner pads 62a, 62b further restricts fluid flow between the first primary ports 28, 28' and the exhaust ports 24, 24', 26, 26' through the passages 75a, 75b. Furthermore, engagement between the seats 76a, 76b and the outer pads 64a, 64b provides an additional restriction to fluid flow between the pilot ports 20, 20', 22, 22' and the exhaust ports 24, 24', 26, 26' through the passages 75a, 75b.

Each third pad 70a, 70b engages the associated second face 80a, 80b when the slider valve 40 is placed in the fully open position. By engaging the seats 76a, 76b, the third pads 70a, 70b prevent the slider valve 40 from moving beyond the fully open position when moving from the intermediate and closed positions. In addition, engagement between the seats 76a, 76b and the third pads 70a, 70b further restricts fluid flow between the primary ports 28, 28', 30, 30' and the exhaust ports 24, 24', 26, 26' through the passages 75a, 75b.

It should be appreciated that the function of restricting fluid flow as provided by a given pair of pads 62a and 62b, 64a and 64b, and 70a and 70b is still provided for, though possibly less effectively, should the given pair of pads 62a and 62b, 64a and 64b, or 70a and 70b be omitted.

The placement of the slider valve 40 is determined in part by the direction of the net force of the fluid forces acting on the faces 54, 56, 58, 60 of the slider valve 40. In other words, if the sum of the fluid forces acting on the first face 54 of the first portion 48 and the first face 58 of the second portion 50 is less than the sum of the fluid forces acting on the second face 58 of the first portion 48 and the second face 60 of the second portion 50, then the net effect of the fluid forces acting on the slider valve 40 will be to urge the slider valve 40 toward the fully open position. Conversely, if the sum of the fluid forces acting on the first faces 54, 58 is greater than the sum of the fluid forces acting on the second faces 56, 60, then the net effect of the fluid forces acting on the slider valve 40 will be to urge the slider valve 40 toward the closed position. Additionally, when the sum of the forces acting on the first faces 54, 58 is substantially equal to the sum of the forces acting on the second faces 56, 60, the fluid forces acting on the faces 54, 56, 58, 60 have no effect in displacing the slider valve 40.

Another factor in determining the placement of the slide valve 40 is the force of the spring 72 acting on the slider valve 40. In applications presenting the condition of having the sum of the forces acting on the first faces 54, 58 equal the sum of the forces acting on the second faces 56, 60, the spring 72 biases the slider valve 40 in the intermediate position. In other applications in which the net effect of the fluid forces of the faces 54, 56, 58, 60 is significantly greater than the force of the spring 72, the force of the spring 72 may be considered negligible.

The fluid force acting on a given face 54, 56, 58, 60 is a function of the surface area of and the fluid pressure acting on the given face 54, 56, 58, 60. The fluid pressure acting on the given face 54 56, 58, 60 is dependent on many factors including the fluid pressures of the associated fluid sources; the size of the associated ports 20, 20', 22, 22', 24, 24', 26, 26', 28, 28', 30, 30'; the effective restriction of the flow path between the fluid sources and the associated ports 20, 20', 22, 22', 24, 24', 26, 26', 28, 28', 30, 30'; the effective restriction of the flow path between the ports 20, 20', 22, 22', 24, 24', 26, 26', 28, 28', 30, 30' and the given face 54, 56, 58, 60; the fluid viscosity; and other known factors.

The factors affecting the forces acting on the faces 54, 56, 58, 60 are predetermined such that the position of the pilot valve 36 and the resultant pressurization or depressurization of the passage 47 controls the placement of the slider valve 40.

The microvalve device 10 may be configured as a normally open valve or as a normally closed valve. As a normally open valve, the slider valve 40 moves toward the closed position when the actuator 38 is energized and opens when the actuator 38 is de-energized. As a normally closed valve, the slider valve 40 opens when the actuator is energized and closes when the actuator 38 is de-energized. Whether the microvalve device 10 is configured as a normally open valve or a normally closed valve depends on the fluid pressures of the fluid sources associated with each port 20, 20', 22, 22', 24, 24', 26, 26', 28, 30, 30', and the spring force of the spring 72. The microvalve device 10 is configured as a normally open valve, as shown in FIG. 1A, by preferably connecting the first pilot ports 20, 20' to a "low pressure" fluid source and by connecting the second pilot ports 22, 22' to a "high pressure" fluid source. Additionally, as a normally open valve, it is preferable that the fluid source associated with the first pilot ports 20, 20' has a fluid pressure no greater than the fluid pressures of the fluid sources associated with the first primary ports 28, 28' and the exhaust ports 24, 24', 26, 26', the fluid sources associated with the first primary ports 28, 28' and the exhaust ports 24, 24', 26, 26' have fluid pressures no greater than the fluid pressure of the fluid source associated with the second pilot ports 22, 22', and the fluid source associated with the second primary ports 30, 30' has a fluid pressure no greater than the fluid pressure of the fluid source associated with the first primary ports 28, 28'. On the other hand, the microvalve device 10 is configured as a normally closed valve (not shown) by preferably connecting the first pilot ports 20, 20' to a "high pressure" fluid source and by connecting the second pilot ports 22, 22' to a "low pressure" fluid source. In addition, as a normally closed valve, it is preferable that the fluid sources associated with the first primary ports 28, 28' and the exhaust ports 24, 24', 26, 26' have fluid pressures no greater than the fluid pressures of the fluid source associated with the first pilot ports 20, 20', the fluid sources associated with the second pilot ports 22, 22' has a fluid pressures no greater than the fluid pressures of the fluid sources associated with the first primary ports 28, 28' and the exhaust ports 24, 24', 26, 26', and the fluid source associated with the second primary ports 30, 30' has a fluid pressure no greater than the fluid pressure of the fluid source associated with the first primary ports 28, 28'.

The microvalve device 10 is made using suitable MEMS fabrication techniques, such as the fabrication techniques disclosed in U.S. patent application Ser. No. 09/148,026 filed Sep. 3, 1998, which is incorporated herein by reference.

It should be appreciated that the body 12 may be formed from adjoining plates numbering more or less than three. Regarding these alternative embodiments, the cavity 42 is defined by a cavity or recess formed in one or more of the adjoining plates.

It should also be appreciated that while it is preferable that the components of the second plate 16 are integrally formed, any or all of the components of the second plate 16 may be separately formed and bonded or otherwise suitably attached to the associated component or components.

In operation, when the microvalve 10 is configured as a normally open valve, the slider valve 40 moves from either the fully open position or the intermediate position to the closed position when the actuator 38 is energized. Additionally, when configured as a normally open valve, the slider valve 40 moves from the closed position to either the fully open position or the intermediate position when the actuator 38 is de-energized. Specifically, when the actuator 38 is energized, electrical current flows through the ribs 44a, 44b. The flow of electrical current through the ribs 44a, 44b causes the ribs 44a, 44b to thermally expand and elongate. The elongation of the ribs 44a, 44b in turn displaces the spine 46 from the position shown in FIG 1A to the position shown in FIG 1B.

The displacement of spine 46 then causes the pilot valve 36 to move from the first position to the second position thereof, as shown in FIGS. 1A and 1B, respectively. In moving from the first position to the second position, the pilot valve 36 increasingly blocks the first pilot ports 20, 20', while at the same time, the pilot valve 36 increasingly unblocks the second pilot ports 22, 22', thereby increasing the pressure of the fluid in the passage 47. In the second position, the "high-pressure" fluid source associated with the second pilot ports 22, 22' is placed in fluid communication with the first face 54 of the first portion 48 via the passage 47. As a result, the net force of the forces acting on the faces 54, 56, 58, 60 forces to slider valve 40 to move from either the fully open or intermediate positions to the closed position.

As the slider valve 40 moves toward the closed position, the stepped-up portion of the first portion 48 of the slider valve 40 overlaps the stepped down portion of the sleeve 74, which cause the clearances between the first portion 48 and the sleeve 74 to decrease. By decreasing the clearances between the first portion 48 and the sleeve 74, the "high-pressure" fluid acting on the first face 54 is further restricted from flowing through the passages 75a, 75b to the "low-pressure" fluid source associated with the exhaust ports 24, 24', 26, 26'. Also, as the slider valve 40 moves toward the closed position, the second portion 50 of the slider valve 40 increasingly blocks the second primary ports 30, 30'.

Having reached the closed position, the inner and outer pads 62a, 62b, 64a, 64b engage the first faces 78a, 78b of the corresponding seats 76a, 76b, thereby limiting the advancement of the slider valve 40. Additionally, engagement between the outer pad 64a and the seat 76a restricts the "high-pressure" fluid acting on the first face 54 of the slider valve 40 from flowing to the "low-pressure" fluid source via passage 75a and the first exhaust ports 24, 24'. Similarly, engagement between the outer pad 64b and the seat 76b restricts the "high-pressure" fluid acting on the first face 54 of the slider valve 40 from flowing to the "low-pressure" fluid source via the passage 75b and the second exhaust ports 26, 26'. Furthermore, engagement between the inner pad 62a and the seat 76a restricts fluid flow from the "high-pressure" fluid source through the first primary ports 28, 28' to the "low-pressure" fluid source via the passage 75a and the first exhaust ports 24, 24'. Similarly, engagement between the inner pad 62b and the seat 76b restricts fluid flow from the "high-pressure" fluid source through the first primary ports 28, 28' to the "low-pressure" fluid source via the passage 75b and the second exhaust ports 26, 26'. Finally, when placed in the closed position, the second portion 50 of the slider valve 40 fully covers the second primary ports 30, 30'. By covering the second primary ports 30, 30', the slider valve 40 effectively blocks fluid from flowing from the "high-pressure" fluid source through the first primary ports 28, 28' to the "low-pressure" fluid source through the second primary ports 30, 30'.

When the actuator 38 is de-energized, current ceases to flow through the ribs 44a, 44b, which causes the ribs 44a, 44b to cool and in turn to contract and shorten. The contraction of the ribs 44a, 44b forces the spine 46 to be displaced in a manner which causes the pilot valve 36 to move from the second position to the first position. In moving from the second position to the first position, the pilot valve 36 increasingly blocks the second pilot ports 22, 22', while at the same time, the pilot valve 36 increasingly unblocks the first pilot ports 20, 20', lowering the pressure of the fluid in the passage 47. When the pilot valve 36 reaches the first position, the "low-pressure" fluid source associated with the first pilot ports 20, 20' is placed in fluid communication with the first face 54 of the first portion 48 via the passage 47, in place of the "high-pressure" fluid source associated with the second pilot ports 22, 22'. As a result, the net force of the forces acting on the faces 54, 56, 58, 60 forces to slider valve 40 to move from the closed position to either the fully open position or intermediate position.

As the slider valve 40 moves from the closed position, the second portion 50 of the slider valve 40 increasingly unblocks the second primary ports 30, 30'. As the second primary ports 30, 30' are unblocked, fluid is increasing allowed to flow from the "high-pressure" fluid source through the first primary ports 28, 28' to the "low-pressure" fluid source through the second primary ports 30, 30'.

In reaching the fully open position, the third pads 70a, 70b engage the second faces 80a, 80b of the corresponding seats 76a, 76b, thereby preventing further advancement of the slider valve 40. Additionally, engagement between the third pad 70a and the seat 76a further restricts fluid flow from the "high-pressure" fluid source through the first primary ports 28, 28' to the "low-pressure" fluid source via the passage 75a and the first exhaust ports 24, 24'. In addition, engagement between the third pad 70b and the seat 76b further restricts fluid flow from the "high-pressure" fluid source through the first primary ports 28, 28' to the "low-pressure" fluid source via the passage 75b and the second exhaust ports 26, 26'.

The microvalve device 10 configured as a normally closed valve functions substantially the same as the microvalve device 10 configured as a normally open valve as discussed above, except that the slider valve 40 of a normally closed configuration opens when the actuator 38 is energized and closes when the actuator 38 is de-energized.

Figure 5A:
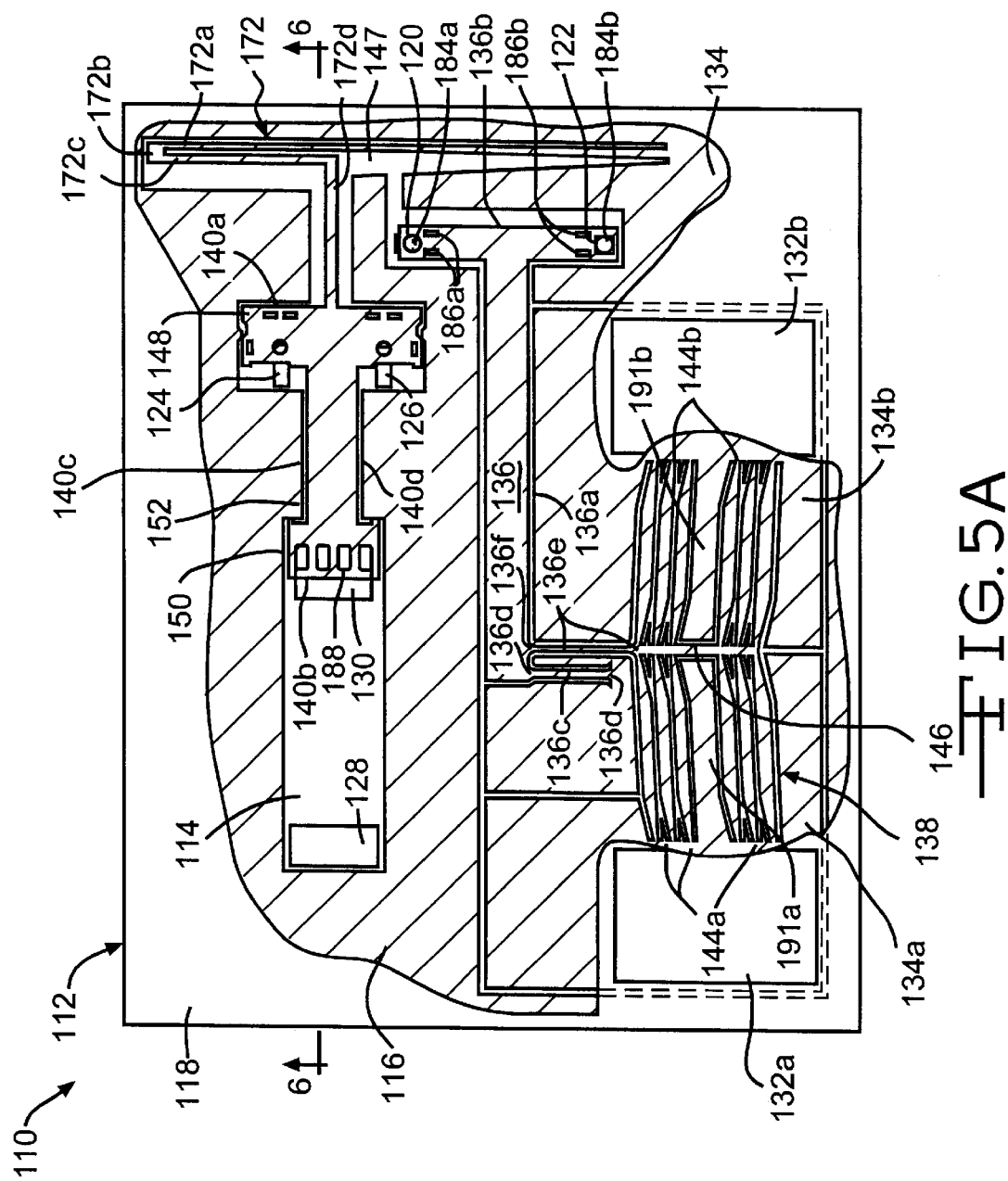
FIG. 5A is a top plan view of a second embodiment of a microvalve device according to this invention partly broken away to show the microvalve device in a first position.

A second embodiment of a microvalve device for controlling fluid flow in a fluid circuit is shown generally at 110 in FIG. 5A. The microvalve device 110 is similar in structure and in function to the microvalve device 10, as such similar 100's series (centennial) and 10's series (non-centennial) numbers indicate similar features. For example, the microvalve device 110 has a body 112, which is generally similar in structure and function to the body 12 of the microvalve device 10. The drawings of this second and subsequent embodiments employing centennial numbering schemes designate features, which unless otherwise specifically described in the figure in which the reference number appears, may be taken to be generally similar in structure and function of the corresponding non-centennial numbered part of the microvalve device 10 and explained by reference to description thereof with respect to the microvalve device 10.

The primary differences between the microvalve device 110 and the microvalve device 10 is that the pilot valve 36 and the slider valve 40 have been modified in a manner that eliminates the need for the ports 20', 22', 24', 26', 28', 30' formed in the third plate 18. Additionally, the spring 72 has been modified in a manner that reduces any influence that the spring 72 might have in causing the slider valve 40 to move laterally when moving between the fully open and closed positions.

Figure 6:
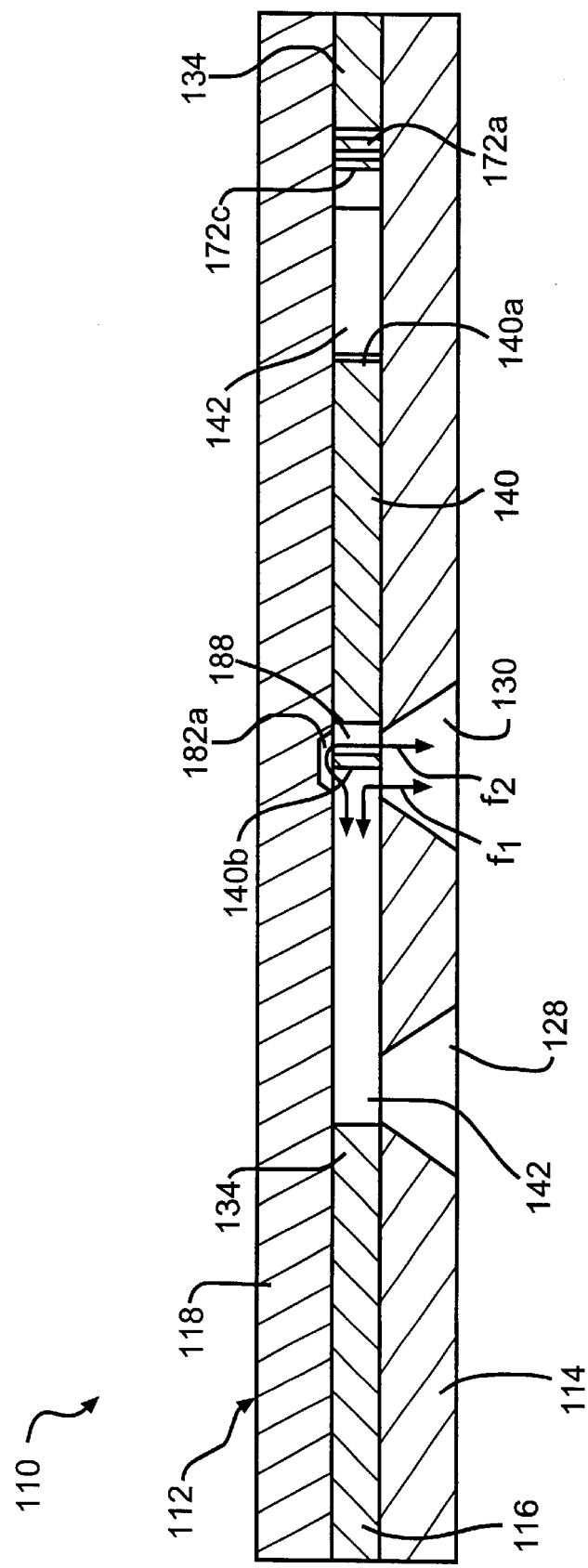
FIG. 6 is an enlarged sectional view of the microvalve device taken along the line 6—6 of FIG. 5A.

The body 112 includes a second plate 116 between and attached to a first plate 114 and a third plate 118, as best shown in FIG. 6.

Figure 5B:
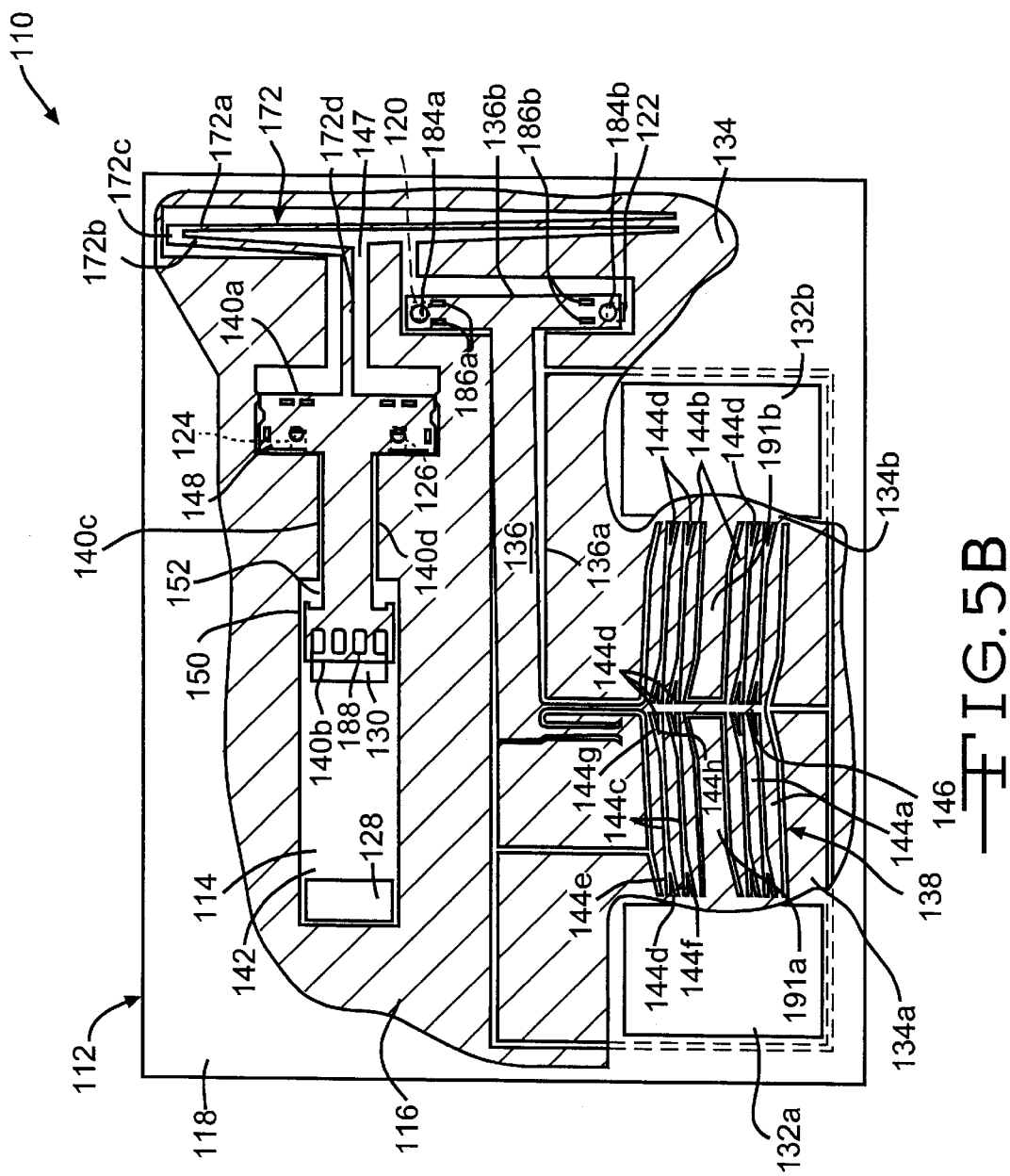
FIG. 5B is a view similar to FIG 5A, except with the microvalve device shown in a second position.

Referring to FIGS. 5A and 5B, the first plate 114 defines a first pilot port 120 and a second pilot port 122. The first plate 114 also defines a first exhaust port 124 and a second exhaust port 126. Referring also to FIG. 6, the first plate 114 further defines a first primary port 128 and a second primary port 130. Alternatively, any or all of the ports 120, 122, 124, 126, 128, 130 may be formed in the third plate 118.

Figure 7:
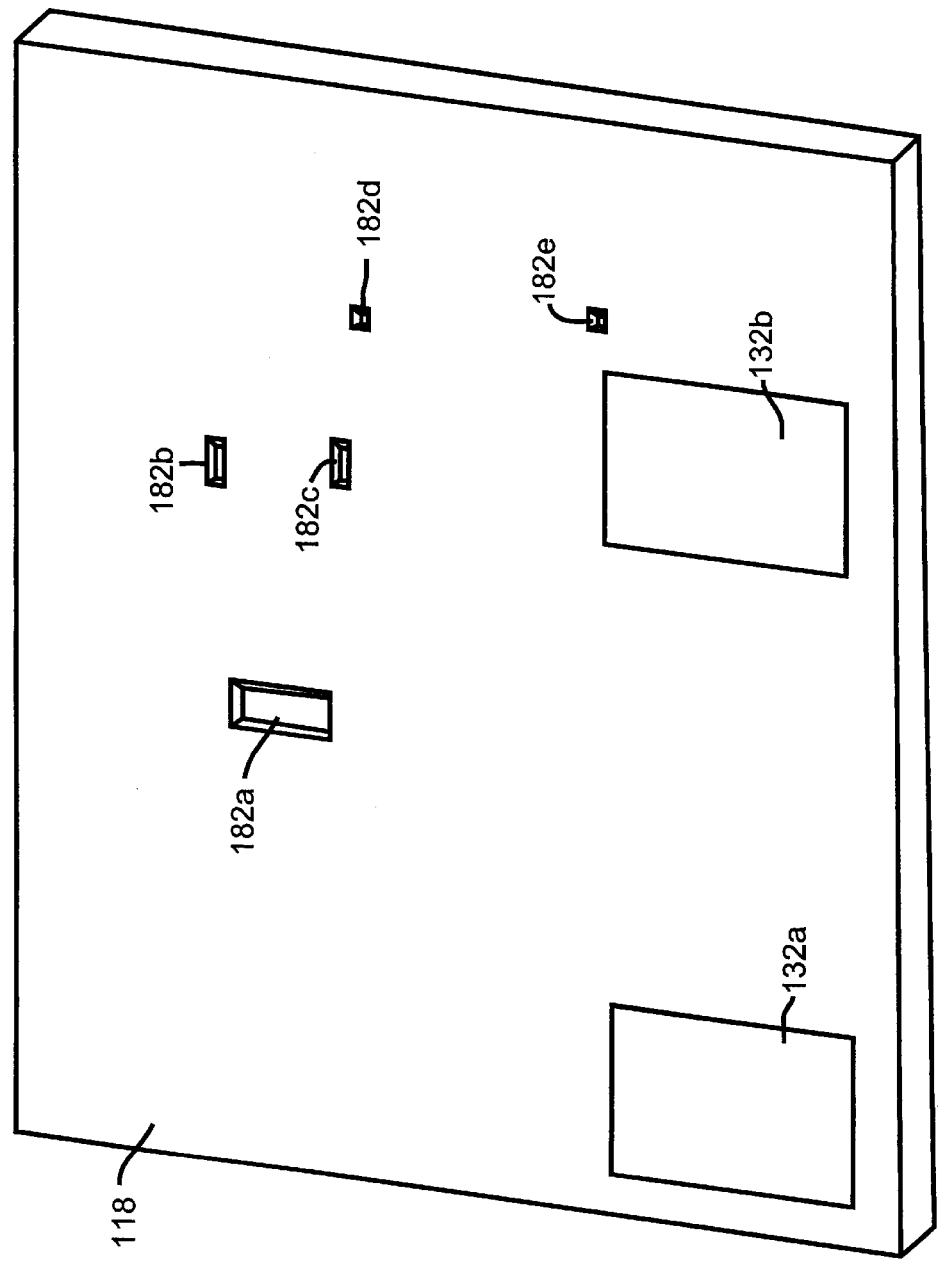
FIG. 7 is a perspective view of a third plate of the microvalve device illustrated in FIGS. 5A and 5B, showing a bottom surface of the third plate.

Referring to FIG. 7, the third plate 118 defines a primary trough 182a. The primary trough 182a aligns with the second primary port 130 as best shown in FIG. 6. The third plate 118 also defines a first exhaust trough 182b and a second exhaust trough 182c. The first and second exhaust troughs 182b and 182c align with the first and second exhaust ports 124 and 126, respectively, in a manner similar to alignment as shown in FIG. 6 between the primary trough 182a and the second primary port 130. In addition, the third plate 118 defines a first pilot trough 182d and a second pilot trough 182d. The first and second pilot troughs 182d and 182e align with the first and second pilot ports 120 and 122, respectively, in a manner similar to alignment between the primary trough 182a and the second primary port 130. Each trough 182a–e provides a similar function, which is discussed below.

Referring to FIGS. 5A, 5B, and 6, the second plate 116 defines a cavity 142. A "T-shaped" pilot valve 136 is disposed in the cavity 142 for movement between a first position (shown in FIG. 5A) and a second position (shown in FIG. 5B). The pilot valve 136 includes an elongated beam 136a attached to a fixed portion 134 of the second plate 116.

A blocking portion 136b extends from a free end of the beam 136a. Preferably, the blocking portion 132b is formed of two portions that extend from opposite sides of the beam 136a. Preferably, each portion of the blocking portion 132b extends 136a at an angle of approximately ninety degrees from to the respective side of the beam 136a. Alternatively, the portions of the blocking portion 132b may extend from the sides of the beam 136a at any suitable angle. Preferably, the blocking portion 136b will be substantially the same plane as the beam 136a. The blocking portion 136b alternately blocks and unblocks the first pilot port 120 and the second pilot port 122 when the pilot valve 136 moves between the first and second positions. The blocking portion 136b allows for greater separation between the pilot ports 120, 122, which may be desirable in certain applications.

Referring to FIGS. 5A and 5B, the blocking portion 136b defines a first pilot duct 184a, which extends between upper and lower surfaces of the pilot valve 136. The first pilot duct 184a is in continuous fluid communication with the first pilot port 120 and the first pilot trough 182d (shown in FIG. 7). As such, the first pilot duct 184a maintains fluid communication between the first pilot port 120 and the first pilot trough 182d through the pilot valve 136 in whatever position the pilot valve 136 is placed in. The blocking portion 136b also defines a second pilot duct 184b, which extends between the upper and lower surfaces of the pilot valve 136. Similar to the arrangement between the first pilot duct 184a, the first pilot port 120, and the first pilot trough 182d, the second pilot duct 184b is in continuous fluid communication with the second pilot port 122 and the second pilot trough 182e (shown in FIG. 7).

The blocking portion 136b further defines a pair of first pilot vents 186a and a pair of second pilot vents 186b. Each pilot vent 186a, 186b extends between the upper and lower surfaces of the pilot valve 136. The first pilot vents 186a are adjacent to the first pilot duct 184a and are adjacent opposite edges of the blocking portion 136b. The second pilot vents 186b are adjacent the second pilot duct 184b and are adjacent opposite edges of the blocking portion 136b. The purpose of the pilot vents 184a, 186b is discussed below.

The second plate 116 further includes a slider valve 140 having opposite ends 140a and 140b and opposite sides 140c and 140d. The slider valve 140 is disposed in a sleeve 174 for movement between a first, fully open position and a second, closed position. The sleeve 174 is preferably integrally formed with the fixed portion 134. FIGS. 5A and 5B show the slider valve 140 in the fully open and closed positions, respectively. As with the slider valve 40 (see FIG. 4), the slider valve 140 may also be placed in an intermediate or biased position, as shown in FIG. 8, which is a position between the fully open and closed positions.

Figure 8:
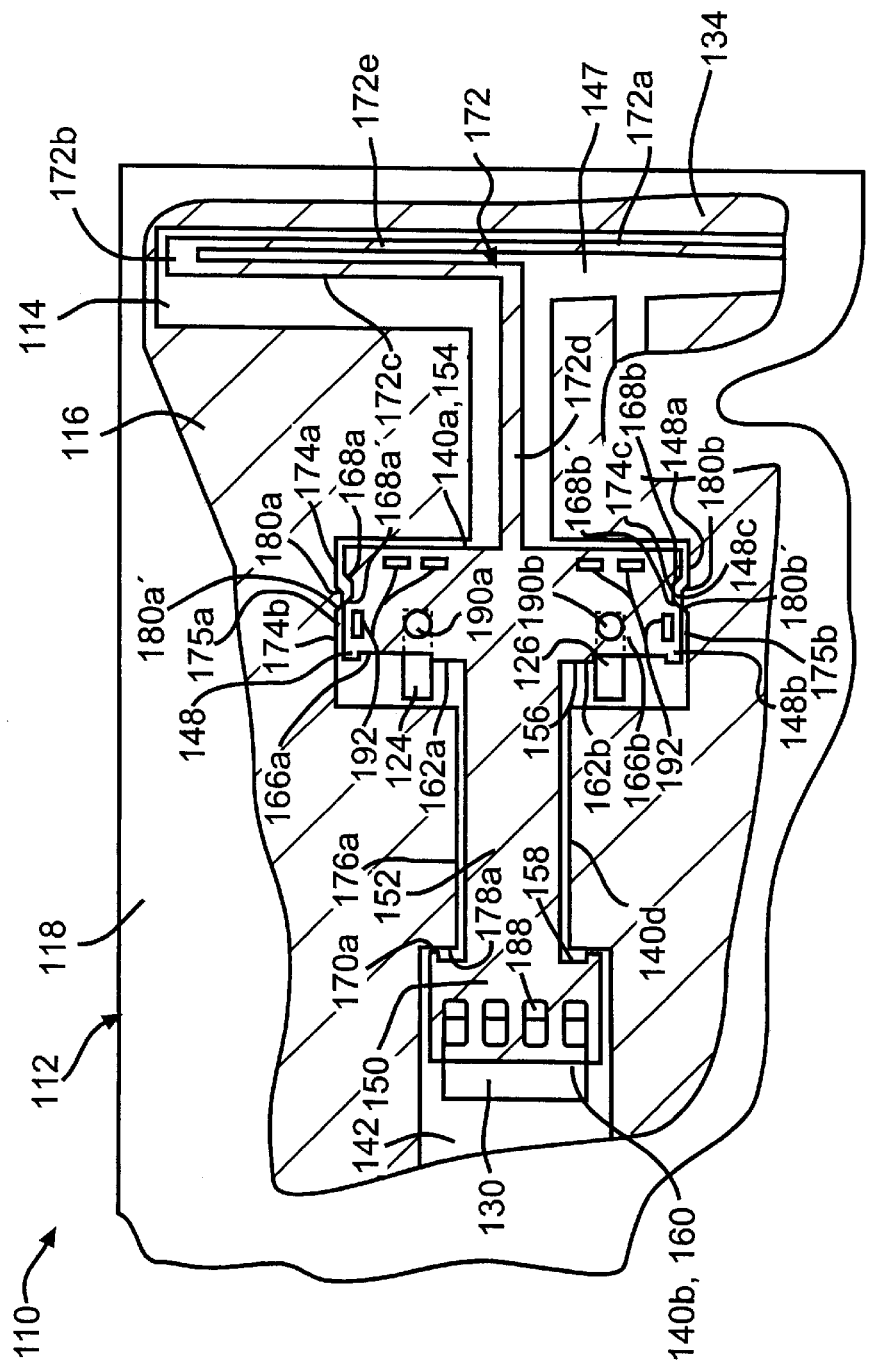
FIG. 8 is an enlarged view of a slider valve of the microvalve device illustrated in FIGS. 5A and 5B shown in an intermediate position.

Referring to FIG. 8, the slider valve 140 includes a first portion 148 and a second portion 150 interconnected by an intermediate portion 152. The second portion 150 defines a plurality of primary ducts 188 that extend between upper and lower surfaces of the slider valve 140. Each primary duct 188 is in continuous fluid communication with the second primary port 130 and the primary trough 182a (shown in FIGS. 6 and 7). As such, the primary ducts 188 maintain fluid communication between the second primary port 130 and the primary trough 182a through the slider valve 136 in whatever position the slider valve 136 is placed.

The first portion 148 defines a first exhaust duct 190a, which extends between the upper and lower surfaces of the slider valve 140 and is placed in continuous fluid communication between the first exhaust port 124 and the first exhaust trough 182b (shown in FIG. 7). The first portion 148 also defines a second exhaust duct 190b, which extends between the upper and lower surfaces the slider valve 140 and is placed in continuous fluid communication between the second exhaust port 126 and the second exhaust trough 182c (shown in FIG. 7). As such, the exhaust ducts 190a, 190b maintain fluid communication between the exhaust ports 124, 126, respectively, and the respective exhaust ducts 182b, 182c through the slider valve 140 in whatever position the slider valve 140 is placed.

The first portion 148 further defines a plurality of slider vents 192 that extend between the upper and lower surfaces the slider valve 140. The slider vents 192 are distributed along the edges of the end 140a and the sides 140c, 140d.

The ducts 184a, 184b, 190a, 190b, 188 provide a means of balancing the fluid pressures that act on the respective valves 136, 140 as a result of fluid flowing to and from the respective ports 120, 122, 124, 126, 130. Specifically, each duct 184a, 184b, 190a, 190b, 188 allows fluid to flow between the respective port 120, 122, 124, 126, 130 and the associated trough 182d, 182e, 182b, 182c, 182a, respectively, in a sufficiently nonrestrictive manner so that difference between the fluid pressures acting on the upper and lower surface of the respective valve 136, 140 in the area of the particular duct 184a, 184b, 190a, 190b, 188 does not cause the respective valve 136, 140 to move toward and contact the first plate 114 or the third plate 118 in a manner that would interfere with the intended movement of the valve 136, 140.

Additionally, the ducts 184a, 184b, 190a, 190b, 188 in combination with the associated trough 182d, 182e, 182b, 182c, 182a, respectively, allow for an increased fluid flow rate through the respective ports 120, 122, 124, 126, 130 for a given pressure differential across the respective ports 120, 122, 124, 126, 130. Specifically, the fluid flow rate through a given port 120, 122, 124, 126, 130 for a given pressure differential is a function of the area of the given port 120, 122, 124, 126, 130 unblocked by the respective valve 136, 140. When the respective valve 136, 140 is in a position in which the respective valve 136, 140 partially covers the given port 120, 122, 124, 126, 130, the unblocked area of the given port 120, 122, 124, 126, 130 is equal to the area of the given port 120, 122, 124, 126, 130 uncovered by the respective valve 136, 140 and the area of the given port 120, 122, 124, 126, 130 in communication with the respective duct(s) 184a, 184b, 190a, 190b, 188. Whereas, in the absence of the respective ducts 184a, 184b, 190a, 190b, 188 and the associated trough 182d, 182e, 182b, 182c, 182a, respectively, the unblocked area of the given port 120, 122, 124, 126, 130 is limited to the area uncovered by the respective valve 136, 140. As such, the respective duct(s) 184a, 184b, 190a, 190b, 188 and the associated trough 182d, 182e, 182b, 182c, 182a, respectively, increase the unblock area of the given port 120, 122, 124, 126, 130 when the respective valve 136, 140 is in a position in which the respective valve 136, 140 partially covers the respective port 136, 140. Thus, by increasing the unblocked area of the given port 120, 122, 124, 126, 130 when the respective valve 136, 140 partially covers the respective port 136, 140, the flow rate for a given pressure differential across the given port 120, 122, 124, 126, 130 is increased. FIG. 6 illustrates the fluid flow paths through the primary port 130, which are similar to the fluid flow paths of the other ports 120, 122, 124, 126 having a respective duct 184a, 184b, 190a, 190b and the associated trough 182d, 182e, 182b, 182c, respectively. When the slider valve 140 partially covers the primary port 130 as shown in FIG. 6, fluid is allowed to flow through the primary port 130 through an uncovered portion of the primary port 130 as represented by flow path f1. In addition, the ducts 188 and the trough 182a allow fluid to flow through the primary port 130 through a portion of the primary port 130 in communication with the ducts 188 as represented by flow path f2.

It should be appreciated that while the pilot ducts 184a, 184b and the exhaust ducts 190a, 190b are shown as being circular and the primary ducts 188 are shown as generally rectangular, the ducts 184a, 184b, 190a, 190b, 188 may be any suitable shape. It should also be appreciated that each of the pilot ducts 184a, 184b and each of the exhaust ducts 190a, 190b may be replaced a plurality of similarly formed ducts. Additionally, it should be appreciated that primary ducts 188 may be fewer or more in number than the four ducts 188 as shown.

The vents 186a, 186b, 192 provide a means of balancing the fluid pressures that act on the respective valves 136, 140 as a result of fluid leaking past the valves between the first plate 114 and valves 136, 140 and as a result of fluid leaking past the valves 136, 140 between the third plate 118 and the valves 136, 140. Specifically, each vent 186a, 186b, 192 is designed to intercept the flow of fluid past the respective valve 136, 140 between the respective valve 136, 140 and the first and third plates 114, 188 and to allow the intercepted fluid to flow through the respective valve 136, 140 in a sufficiently nonrestrictive manner so that difference between the fluid pressures acting on the upper and lower surface of the respective valve 136, 140 in the area of the particular vent 186a, 186b, 192 does not cause the respective valve 136, 140 to move toward and contact the first plate 114 or the third plate 118 in a manner that would interfere with the intended movement of the valve 136, 140.

It should be appreciated that while the vents 186a, 186b, 192 are shown as being generally rectangular, the vents 186a, 186b, 192 may be any suitable shape. It should also be appreciated that location and the number of vents may vary depending on a particular application to which the microvalve device 110 is utilized.

Referring to FIGS. 5A and 5B, the second plate 116 further includes an actuator 138 for controlling the movement of the pilot valve 138. The actuator 138 includes an elongated spine 146 attached to the pilot valve 136. The actuator further includes multiple pairs of opposing first ribs 144a and second ribs 144b. Each first rib 144a has a first end attached to a first side of the spine 146 and a second end attached to the fixed portion 134, specifically to a fixed body 134a to which a plurality of first ribs 144a are attached. Similar to the first ribs 144a, each second rib 144b has a first end attached to a second side of the spine 146 and a second end attached to a fixed body 134b formed of the fixed portion 134. Similar to the ribs 44a, 44b of the microvalve device 10 described above, the ribs 144a, 144b are designed to thermally expand and contract. Electrical contacts 132a and 132b are adapted for connection to a source of electrical power to supply electrical current flowing through the ribs 144a and 144b to thermally expand, to elongate, the ribs 144a and 144b. Each end of the ribs 144a, 144b is tapered for reducing the stress acting on the ribs 144a, 144b caused by the expansion and contraction of the ribs 144a, 144b, by allowing the ends to be more flexible. The mid-section of each of the ribs 144a and 144b is relatively wider than the ends to maintain rigidity and thus prevent buckling under the compressive loads to which the ribs 144a, 144b are exposed during thermal elongation.

It is useful in many manufacturing processes, such as the deep reactive ion etching process by which the microvalve device 110 may suitably be manufactured, to maintain uniform widths of gaps between components in close proximity to one another, such as adjacent ones of the ribs 144a illustrated in FIG. 5B. The description of how this may be accomplished that follows in the next two paragraphs is equally applicable to the ribs 144b of the microvalve device 110, and similar principals may suitably may be used on other micromachined structures.

Each of the ribs 144a has a first portion, the mid-section, which is relatively wide. Adjacent faces of the ribs 144a have a slot or gap 144c therebetween which has a given, constant width. In a second portion of the ribs 144a, the portion where the ribs attach to the fixed portion 134a, the adjacent faces of the ribs 144a are spaced apart by a distance which is greater than the width between the adjacent faces at the first portion, due to the tapering of the ends of the ribs 144a. To maintain uniform width of the gap between the adjacent second portions, extension bodies 144d are interposed between longitudinally adjacent second portions of the ribs 144a. A second gap (slot) 144e is defined between each of the extension bodies 144d and an adjacent one of the ribs 144a. The gap 144e has the same width as the gap 144c, and merges with the gap 144c adjacent the point where the second portion of the adjacent rib 144a reaches its maximum width. A third gap 144f is defined between each of the extension bodies 144d and the rib 144a longitudinally adjacent to the rib 144a that is adjacent to the gap 144e. The gap 144f has the same width as the gaps 144c and 144e, and merges with the gaps 144c and 144e adjacent the point where the second portion of the adjacent rib 144a reaches its maximum width. It will be appreciated that the shape of the extension bodies 144d is determined by the adjacent shape of the ribs 144a on either side thereof.

In a third portion of the ribs 144a, the portion where the ribs attach to the spine 146, the adjacent faces of the ribs 144a are spaced apart by a distance which is greater than the width between the adjacent faces at the first portion, due to the tapering of the ends of the ribs 144a. To maintain uniform width of the gap between the adjacent second portions, additional extension bodies 144d are interposed between longitudinally adjacent third portions of the ribs 144a. A fourth gap (slot) 144g is defined between each of the extension bodies 144d and an adjacent one of the ribs 144a. The gap 144g has the same width as the gap 144c, and merges with the gap 144c adjacent the point where the third portion of the adjacent rib 144a reaches its maximum width. A fifth gap 144h is defined between each of the extension bodies 144d and the rib 144a longitudinally adjacent to the rib 144a that is adjacent to the gap 144g. The gap 144h has the same width as the gaps 144c and 144g, and merges with the gaps 144c and 144g adjacent the point where the third portion of the adjacent rib 144a reaches its maximum width.

The microvalve device 110 may be subject to considerable differential pressure between the interior and exterior surfaces thereof. According to the invention, therefore, the design of the microvalve device 110 will preferably include one or more pressure-reinforcing members extending between spaced-apart portions of the wall surfaces of large internal chambers. For example, the actuator 138 includes a first pressure-reinforcing member 191a interposed between selected first ribs 144a. The first pressure-reinforcing member 191a has a fixed end attached to the fixed portion and a free end adjacent to the first side of the spine 146. The first pressure-reinforcing member 191a also has a lower surface attached to the first plate 114 and an upper surface attached to the third plate 118. The actuator 138 also includes a second pressure-reinforcing member 191b interposed between a selected second ribs 144b. The second pressure-reinforcing member 191b has a fixed end attached to the fixed portion and a free end adjacent to the second side of the spine 146. The first pressure-reinforcing member 191a also has a lower surface attached to the first plate 114 and an upper surface attached to the third plate 118. Preferably, the pressure-reinforcing members 191a, 191b each have a height, which corresponds to the dimension between the lower and upper surfaces of the pressure-reinforcing members 191a, 191b that is uniform and slightly greater than the height of the ribs 144a. 144b. The pressure-reinforcing members 191a, 191b reinforce the connections between the second plate 116 and the first and third plates 114, 118 by reducing the surface areas of the first and second plates 114, 118 that are continuously unsupported in the immediate vicinity of the ribs 144a, 144b. Preferably, the pressure-reinforcing members 191a, 191b, the ribs 144a, 144b, the spine 146 and the fixed portion 134 are integrally formed. It should be appreciated that it may be desirable, depending on a particular application, to include additional pressure-reinforcing members 191a and 191b interposed between additionally selected ribs 144a and 144b, respectively, to thereby reduce the distance between pressure-reinforcing members of the microvalve device 110.

Figure 5C:
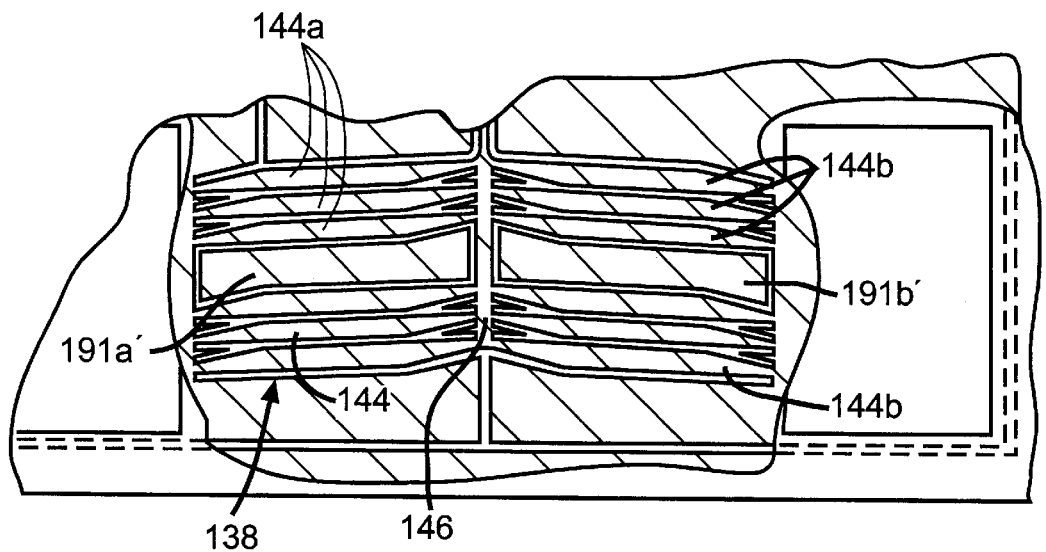
FIG. 5C is a partial view of an alternate embodiment of the actuator illustrated in FIGS. 5A and 5B, showing pressure-reinforcing members thereof.
Figure 5D:
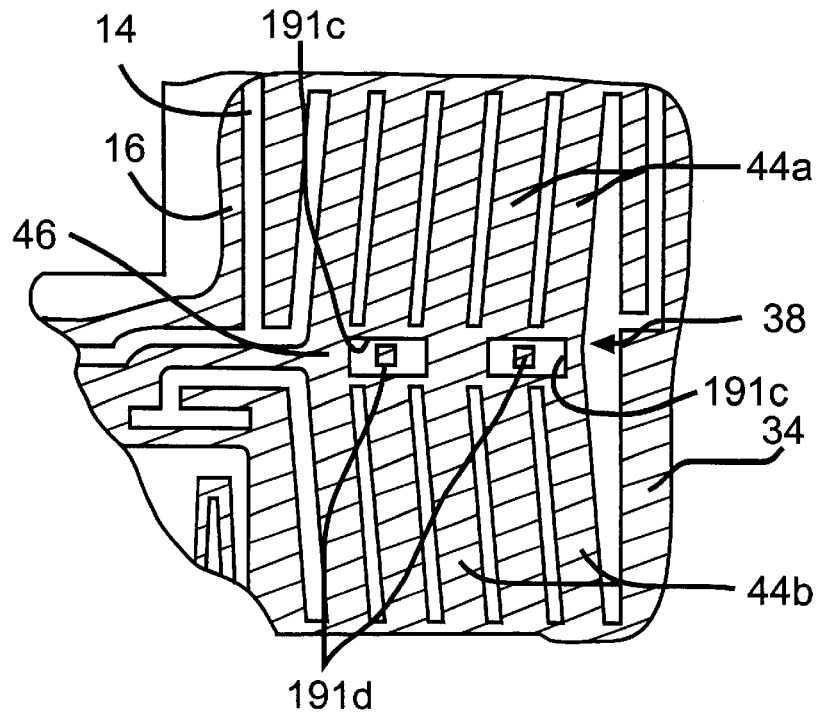
FIG. 5D is a partial view of an alternate embodiment of the actuator illustrated in FIGS. 1A and 1B, showing pressure-reinforcing members thereof.

The pressure-reinforcing members 191a and 191b are shown in FIGS. 5A and 5B in the form of respective pressure-reinforcing "peninsulas" extending from the fixed bodies 134a, 134b formed of the fixed portion 134. FIGS. 5C and SD illustrate alternate embodiments of pressure-reinforcing members. In FIG. 5C, instead of peninsulas, pressure-reinforcing members 191a' and 191b' disposed between the ribs of the actuator 138 take the form of pressure-reinforcing posts not connected to the fixed portion 134. The pressure-reinforcing members 191a' and 191b' are interposed between selected ones of the ribs 144a and 144b. FIG. 5D illustrates an alternate embodiment of the actuator 38. Longitudinally elongate openings 191c are formed through the spine 46. Pressure-reinforcing posts 191d are fixed to the first plate 14 and the third plate 18, and extend through the openings 191c. The openings 191c are preferably sufficiently longitudinally elongate that neither longitudinal end of any opening 191c will impact the pressure-reinforcing post 191d extending therethrough throughout the range of motion of the spine 46.

Referring again to FIG. 8, a pair of steps 168a and 168a' are formed in the side 140c of the first portion 148. Similarly, a pair of steps 168b and 168b' are formed in the side 140d of the first portion 148. The steps 168a, 168a', 168b, 168b' divide the first portion 148 into a first wide portion 148a, a second wide portion 148b and a narrow portion 148c between the first and second wide portions 148a and 148b.

The sleeve 174 defines steps 180a and 180a' adjacent and complementary to the steps 168a and 168a', respectively. Similarly, the sleeve 174 defines steps 180b and 180b' adjacent and complementary to the steps 168b and 168b', respectively. The steps 180a, 180a', 180b, 180b' of the sleeve 174 divide the sleeve 174 into a first wide portion 174a, a second wide portion 174b and a narrow portion 174c between the first and second wide portions 174a, 174b. When the slider valve 140 is in the intermediate position (as shown in FIG. 8), the narrow portion 148c of the slider valve 40 is disposed within the narrow portion 174c of the sleeve 174, the first wide portion 148a of the slider valve 40 is disposed within the first wide portion 174a of the sleeve 174, and the second wide portion 148b of the slider valve 40 is disposed within the second wide portion 174b of the sleeve 174. In the intermediate position, a uniform clearance or passage 175a is formed between the side 140c and the sleeve 174. Similarly, in the intermediate position, a uniform clearance or passage 175b is formed between the side 140d and the sleeve 174. When the slider valve 140 moves to the fully open position shown in FIG. 5A, the second wide portion 148b of the slider valve 140 is partially disposed in the narrow portion 174c of the sleeve 174. When the slider valve 140 moves to the closed position shown in FIG. 5B, the first wide portion 148a of the slider valve 140 is partially disposed in the narrow portion 174c of the sleeve 174. The steps 180a, 180a', 180b, 180b' of the sleeve 174 and the steps 168a, 168a', 168b, 168b'of the slider valve 40 cooperate to greatly restrict the flow of fluid through the passages 175a, 175b by reducing the clearances between the first portion 148 and the sleeve 74 when the slider valve 40 moves toward either the closed or fully open position from the intermediate position shown in FIG. 8.

Referring to FIGS. 5A, 5B and 8, the second plate 116 also includes a spring 172 interconnecting the end 140a of the slider valve 140 and the fixed portion 134. The spring 172 biasing the slider valve 140 in the intermediate position shown in FIG. 8. The spring 172 includes a first elongated arm 172a extending from the fixed portion 134. Though shown having uniform width, the first arm 172a will preferably have a reduced width "waist" to give a general hour glass shape in plan view. A shim 172b extends from the first arm 172a toward the slider valve 140. A right angle is formed between the first arm 172a and the shim 172b when the spring 172 is in a relaxed state or "as fabricated" position, as shown in FIG. 8. Preferably, the shim 172a is of generally uniform width and thickness. A second elongated arm 172c extends from the shim 172b toward the end of the first arm 172a attached to the fixed portion 134. A right angle is formed between the second arm 172c and the shim 172b when the spring 172 is in the "as fabricated" position. Additionally, when the spring 172 is in the "as fabricated" position, a gap is formed between the first arm 172a and the second arm 172c. Preferably, the second arm 172c is of generally uniform width and thickness. A third elongated arm 172d interconnects the second arm 172c and the end 140a of the slider valve 140. Right angles are formed between the third arm 172d and the second arm 172c and between the third arm 172d and the end 140a when the spring 172 is in the "as fabricated" position. Preferably, the third arm 172d is of generally uniform width and thickness. The shim 172b is relatively rigid compared to the first and second arms 172a, 172c. The lengths and widths of the first arm 172a and the second arm 172c are sized so that the first arm 172a and the second arm 172c bend in a manner which causes the third arm 172d and consequently the slider valve 140 to move along the longitudinal axis of the slider valve 140 when the slider valve 140 moves between the fully open and closed positions. In other words, the first arm 172a and the second arm 172c are sized so that the third arm 172c maintains a substantially perpendicular relationship to the end 140a of the slider valve 140 when the slider valve 140 moves between the fully open and closed positions.

In manners similar to those described relating to the microvalve device 10, the microvalve device 110 may be configured as a normally open valve or as a normally closed valve.

Figure 9A:
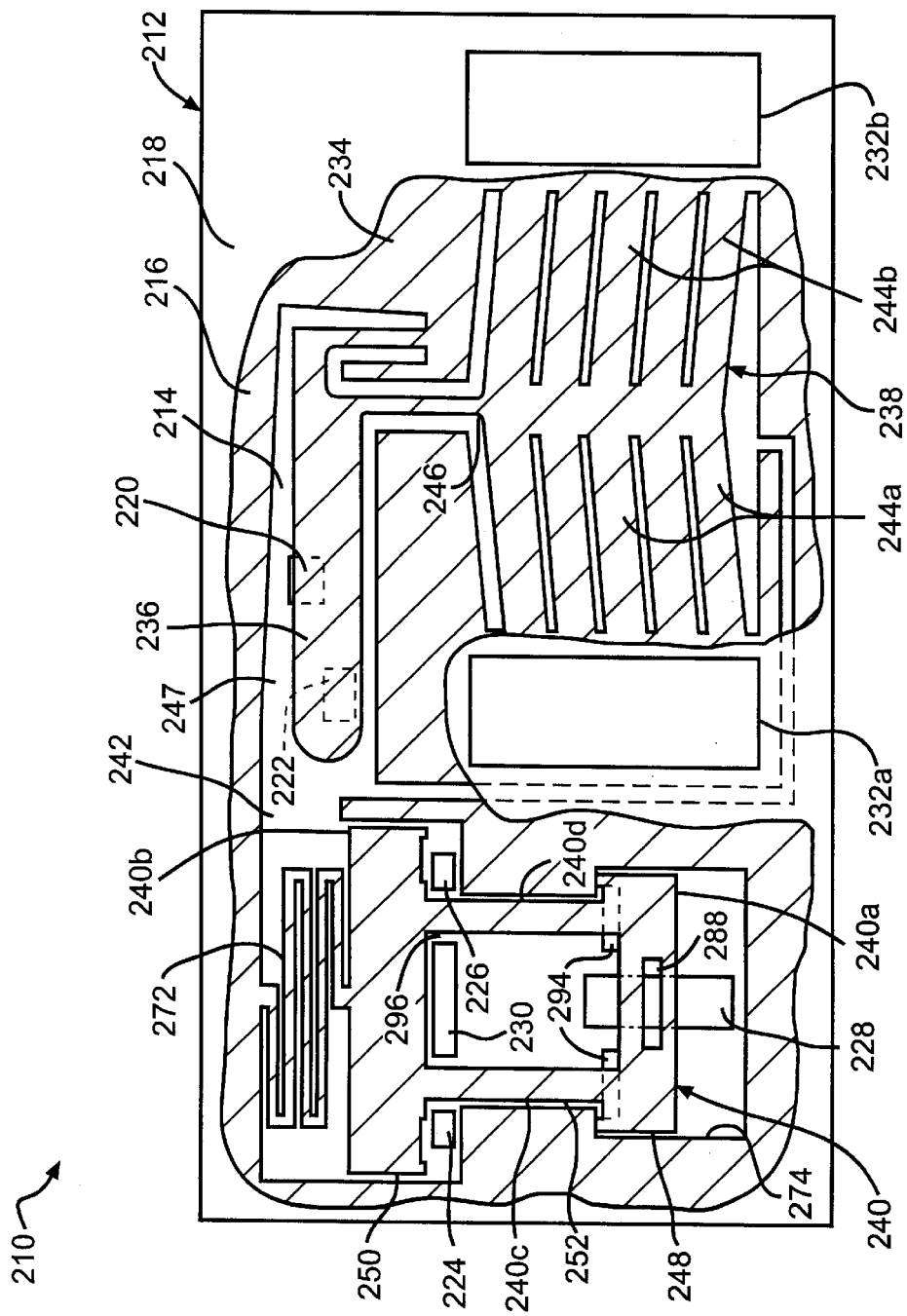
FIG. 9A is a top plan view of a third embodiment of a microvalve device according to this invention partly broken away to show the microvalve device in a first position.

A third embodiment of a microvalve device for controlling fluid flow in a fluid circuit is shown generally at 210 in FIG. 9A. The microvalve device 210 is similar in structure and in function to the microvalve devices 10 and 110, as such similar 200 series, 100 series and 10 series numbers indicate similar features. A primary difference between the microvalve device 210 and the microvalve device 10 is that the slider valve 40 of the microvalve device 10 has been modified. As a result of modifying the slider valve 40, the orientations of the primary ports 28, 30 have also been modified. Additionally, the ports 20', 22', 24', 26', 28', 30' formed in the third plate 18 have been eliminated.

The microvalve device 210 includes a body 212. The body 112 includes a second plate 216 attached between a first plate 214 and a third plate 218.

The first plate 214 defines a first primary port 228 and a second primary port 230. The first plate 214 also defines a pair of channels 294. Alternatively, any or all of the primary ports 228, 230 and the channels 294 may be formed in the third plate 218. The purpose for the channels 294 is discussed below.

Figure 9B:
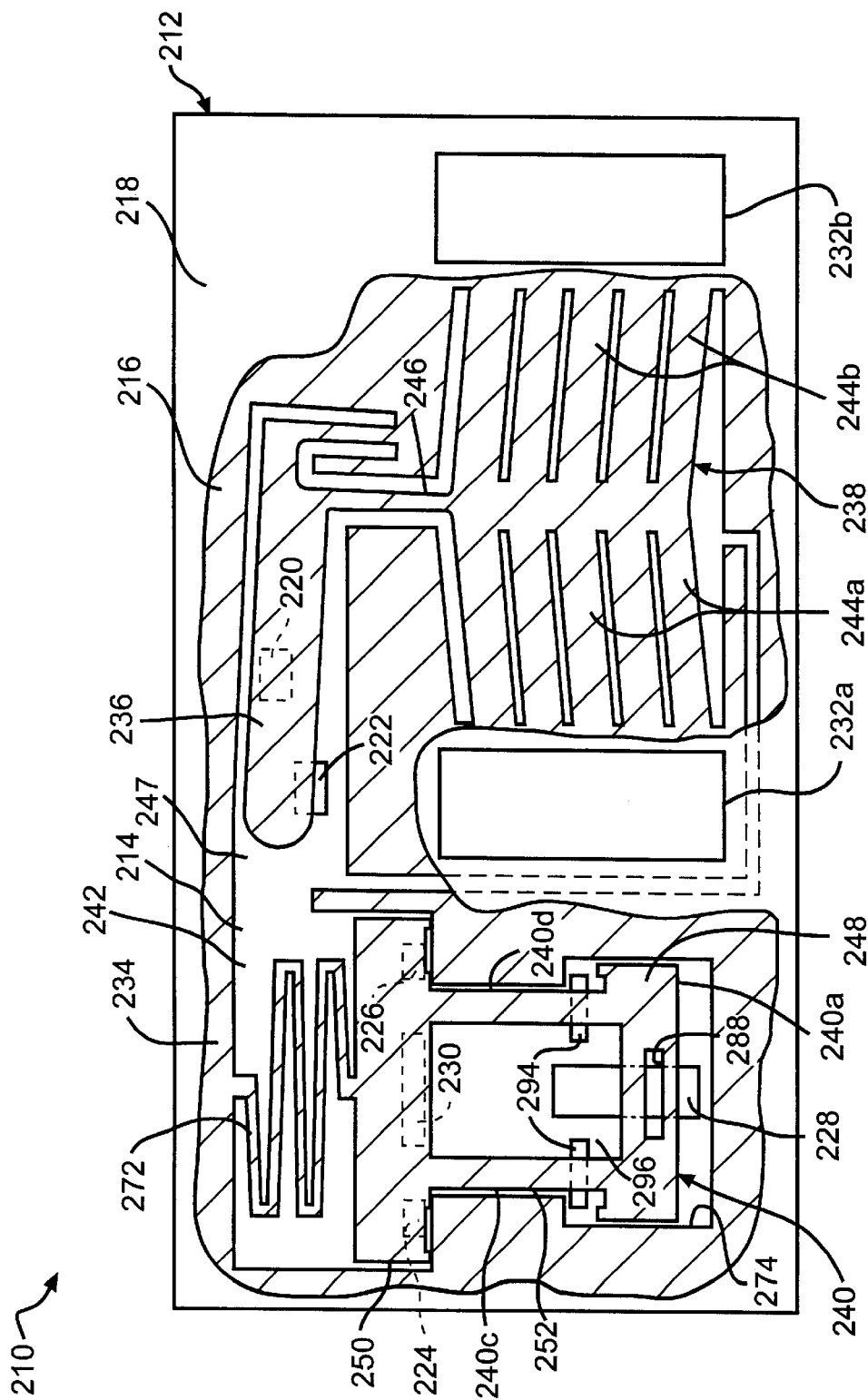
FIG. 9B is a view similar to FIG. 9A, except with the microvalve device shown in a second position.

The second plate 216 includes a slider valve 240 having opposite ends 240a and 240b and opposite sides 240c and 240d. The slider valve 240 is disposed in a sleeve 274 for movement between a first, fully open position and a second, closed position. FIGS. 9A and 9B show the slider valve 140 in the fully open and closed positions, respectively. As with the slider valve 40 (see FIG. 4), the slider valve 40 may also be placed in an intermediate or biased position.

Figure 10:
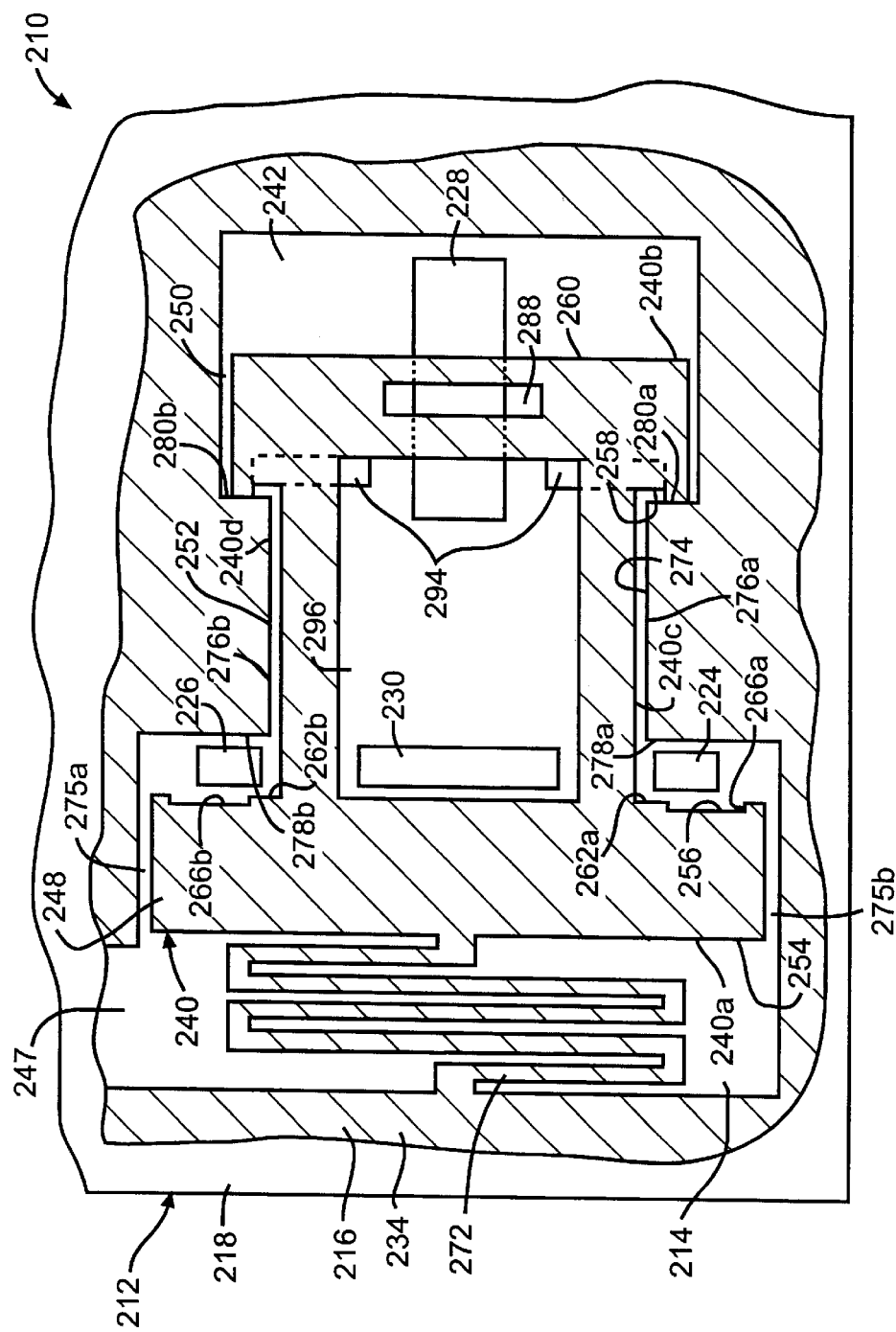
FIG. 10 is an enlarged view of a slider valve of the microvalve device illustrated in FIG. 9A and 9B shown in the first position.

FIG. 10 is an enlargement of the slider valve 240 shown in FIG. 9A. The slider valve 240 is disposed in a sleeve 272 that is preferably integrally formed with a fixed portion 234 of the microvalve device 210. The slider valve 240 includes a first portion 248 and a second portion 250 interconnected by an intermediate portion 252. The first portion 248 has a first face 254 and a second face 256 opposite the first face 254. The second portion 250 has a first face 258 and a second face 260 opposite the first face 258. The first face 254 of the first portion 248 and the second face 260 of the second portion 250 are at the ends 240a and 240b of the slider valve 240, respectively. The second face 256 of the first portion 248 and the first face 258 of the second portion 250 oppose each other. The intermediate portion 252 defines a centrally disposed aperture 296 therethrough.

The slider valve 240 is aligned with the first primary port 228 such that the second portion 250 covers a constant area of the first primary port 228 when moving between the fully open and closed positions. Additionally, when moving between the fully open and closed positions, a varying portion of the first primary port 228 is placed in constant fluid communication with the second face 260 of the second portion 250 and another varying portion of the first primary port 228 is placed in constant fluid communication with the aperture 296. When the slider valve 240 is in or near the fully open position, the second primary port 230 is also placed in fluid communication with the aperture 296. By placing both the primary ports 228, 230 in fluid communication with the aperture 296, fluid is allowed to flow between the first primary port 228 and the second primary ports 230. When the slider valve 240 is in the closed position, the second primary port 230 is fully covered by the first portion 248. By fully covering the second primary port 230, fluid flow between the first primary port 228 and the second primary port 230 is effectively blocked.

The slider valve 240 is aligned with the channels 294 such that one of each of the channels 294 is adjacent one of each of the sides 240c, 240d of the slider valve 140. Each channel 294 places a corresponding portion of the first face 256 of the second portion 250 in constant fluid communication with the aperture 296. The channels 294 are sized so that the effective restriction to fluid flow through a given channel 294 is less than the effective restriction to fluid flow between the interface of the sleeve 274 and the associated side 240c, 240d of the slider valve 240 in the region between the channels 294 and the first face 256. When the slider valve 240 moves between the fully open and closed positions, fluid flows through the channels 294 in order to accommodate for changes in fluid volume between the sleeve 274 and the first face 256 of the second portion 250. Alternatively, the channels 294 may be formed in the slider valve 240.

In manners similar to those described relating to the microvalve device 10, the microvalve device 210 may be configured as a normally open valve or as a normally closed valve.

Figure 11A:
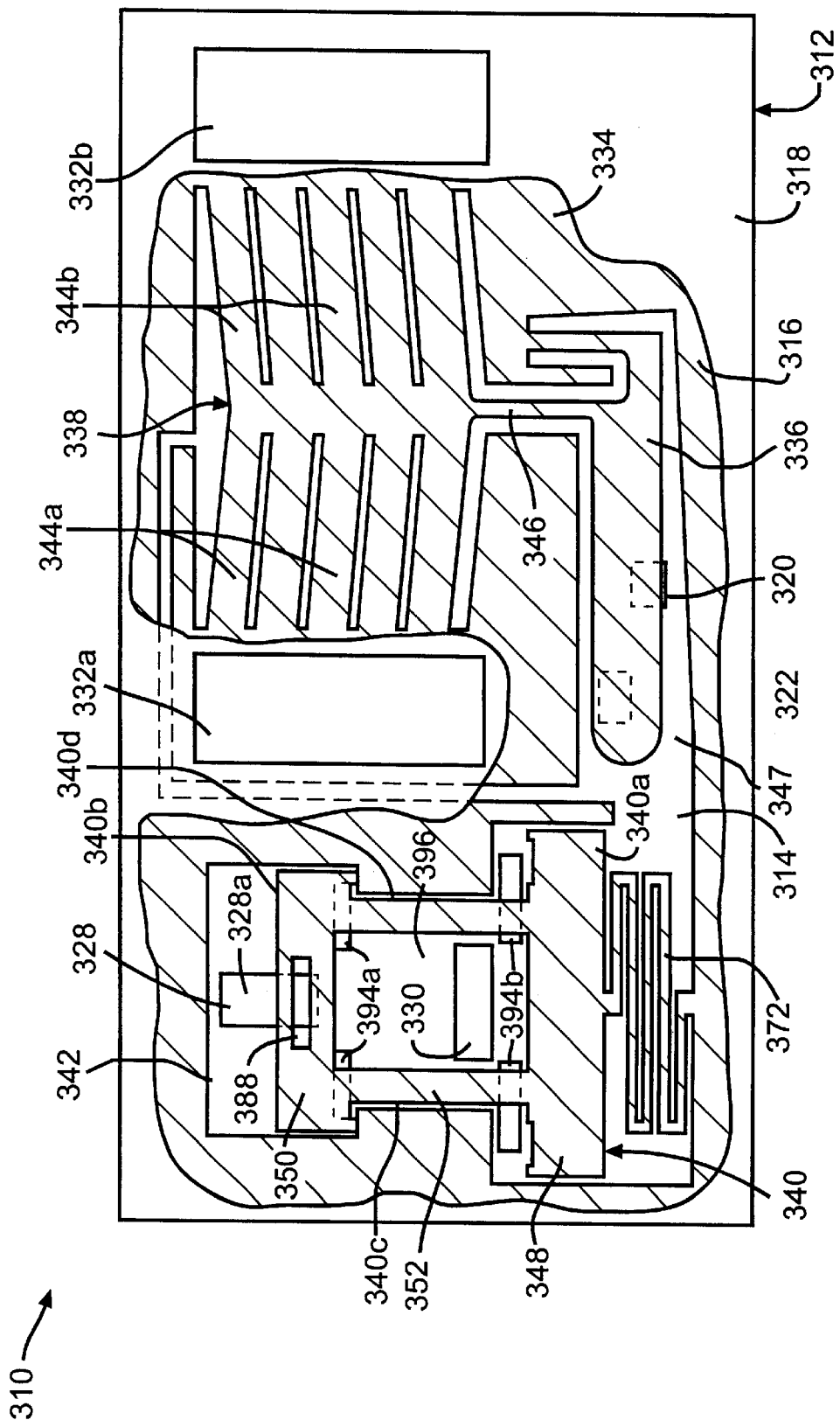
FIG. 11A is a top plan view of a fourth embodiment of a microvalve device according to this invention partly broken away to show the microvalve device in a first position.

A fourth embodiment of a microvalve device for controlling fluid flow in a fluid circuit is shown generally at 310 in FIG. 11A. The microvalve device 310 is similar in structure and in function to the microvalve device 210, as such similar 300 series and 200 series numbers indicate similar features. A primary difference between the microvalve device 310 and the microvalve device 210 is that the orientations of the primary ports 228, 230 of the microvalve device 210 have been modified. In addition, the exhaust ports 224, 226 have been eliminated.

The microvalve device 310 includes a body 312. The body 312 includes a second plate 316 between and attached to a first plate 314 and a third plate 318.

The first plate 314 defines a first primary port 328 and a second primary port 330. The first plate 314 also defines a pair of first channels 394a adjacent the first primary port 328 and a pair of second channels 394b adjacent the second primary port 328. Alternatively, the primary ports 328, 330 and/or the channels 394a, 394b may be formed in the third plate 318.

Figure 11B:
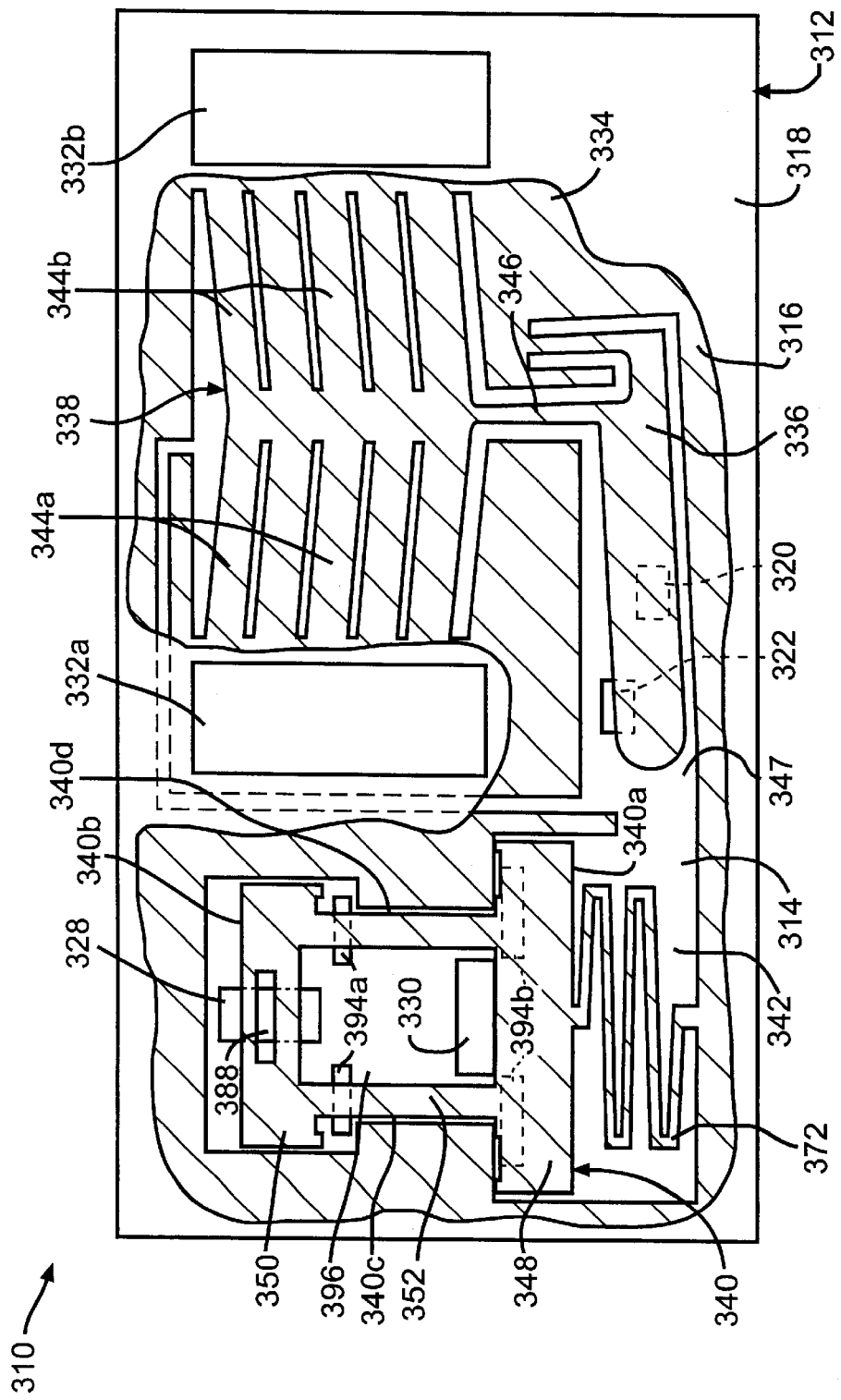
FIG. 11B is a view similar to FIG. 11A, except with the microvalve device shown in a second position.

The second plate 316 includes a slider valve 340 having opposite ends 340a and 340b and opposite sides 340c and 340d. The slider valve 340 is movably disposed in a sleeve 374 for movement between a first, closed position and a second, fully open position. FIGS. 11A and 11B show the slider valve 340 in the closed and fully open positions, respectively.

Figure 12:
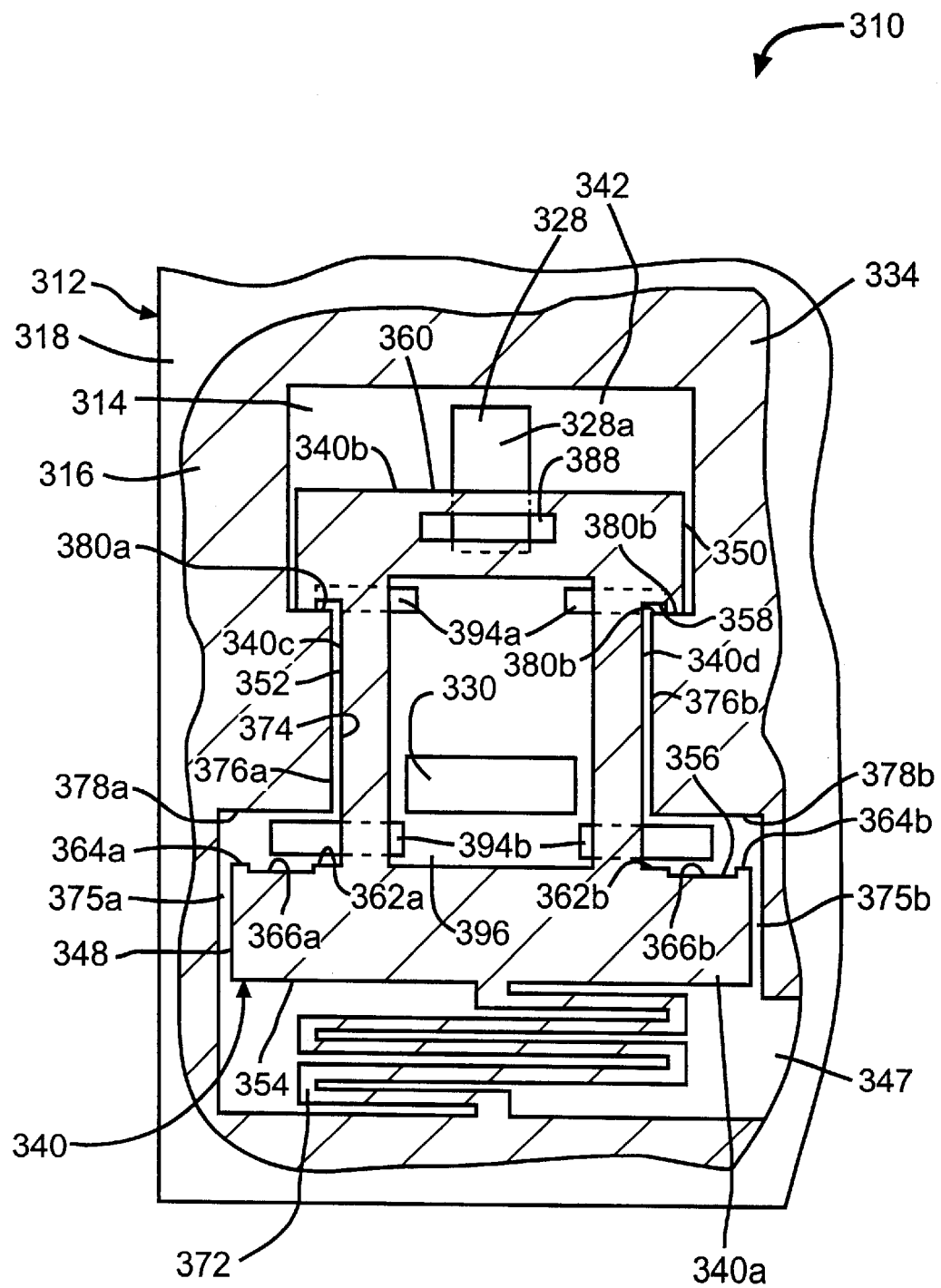
FIG. 12 is an enlarged view of a slider valve of the microvalve device illustrated in FIGS. 11A and 11B shown in the first position.

FIG. 12 is an enlargement of the slider valve 340 as shown in FIG. 11A. The slider valve 340 includes a first portion 348 and a second portion 350 interconnected by an intermediate portion 352. The first portion 348 has a first face 354 and a second face 356 opposite the first face 354. The second portion 350 has a first face 358 and a second face 360 opposite the first face 358. The first face 354 of the first portion 348 and the second face 360 of the second portion 350 are at opposites ends of the slider valve 340. The second face 356 of the first portion 348 and the first face 358 of the second portion 350 oppose each other. The intermediate portion 352 defines a centrally disposed aperture 396 therethrough.

The slider valve 340 is aligned with the second primary port 330 such that the second primary port 330 is placed in constant fluid communication with the aperture 396. The slider valve 340 is aligned with the first primary port 328 such that a varying portion of the first primary port 328 is placed in constant fluid communication with the second face 360 of the second portion 350. Additionally, when the slider valve 340 is in the closed position (FIGS. 11A and 12), the second portion 350 blocks the first primary port 328 except for a portion 328a of the first primary port 328 that remains in fluid communication with the second face 360. In doing so, fluid is effectively prevented from flowing between the primary ports 328, 330. When the slider valve 340 moves to the fully open position (FIG. 11B), the second portion 350 unblocks an increasing portion of the first primary port 328 adjacent the first end 358 of the second portion 350. The portion of the first primary port 328 unblocked by the second portion 350 is placed in fluid communication with the aperture 396. By placing an increasing portion of the first primary port 328 in fluid communication with the aperture 396, fluid is increasingly allowed to flow between the primary ports 328, 330.

The slider valve 340 is aligned with the first channels 394a such that one of the first channels 394a is in fluid communication with a passage 375a defined by the side 340c and the sleeve 374. The other first channel 394a is in fluid communication with a passage 375a defined by the side 340d and the sleeve 374. Each first channel 394a places a portion of the first face 358 in constant fluid communication with the aperture 396. The slider valve 340 is aligned with the second channels 394b such that one the second channels 394b is in fluid communication with the passage 375a and the other second channel 394b is in fluid communication with a passage 375b. Each second channel 394b places a portion of the second face 356 of the first portion 348 in constant fluid communication with the aperture 396. By allowing fluid to flow between the passages 375a and 375b and the primary port 330 through the channels 394b, the exhaust ports 224, 226 of the microvalve device 210 may be eliminated. Each channel 394a, 394b is sized so that the effective restriction to fluid flow through the channel 394a, 394b is less than the effective restriction to fluid flow between the sleeve 374 and the associated side 340c, 340d of the slider valve 340.

In manners similar to those described relating to the microvalve device 10, the microvalve device 310 may be configured as a normally open valve or as a normally closed valve.

Figure 13A:
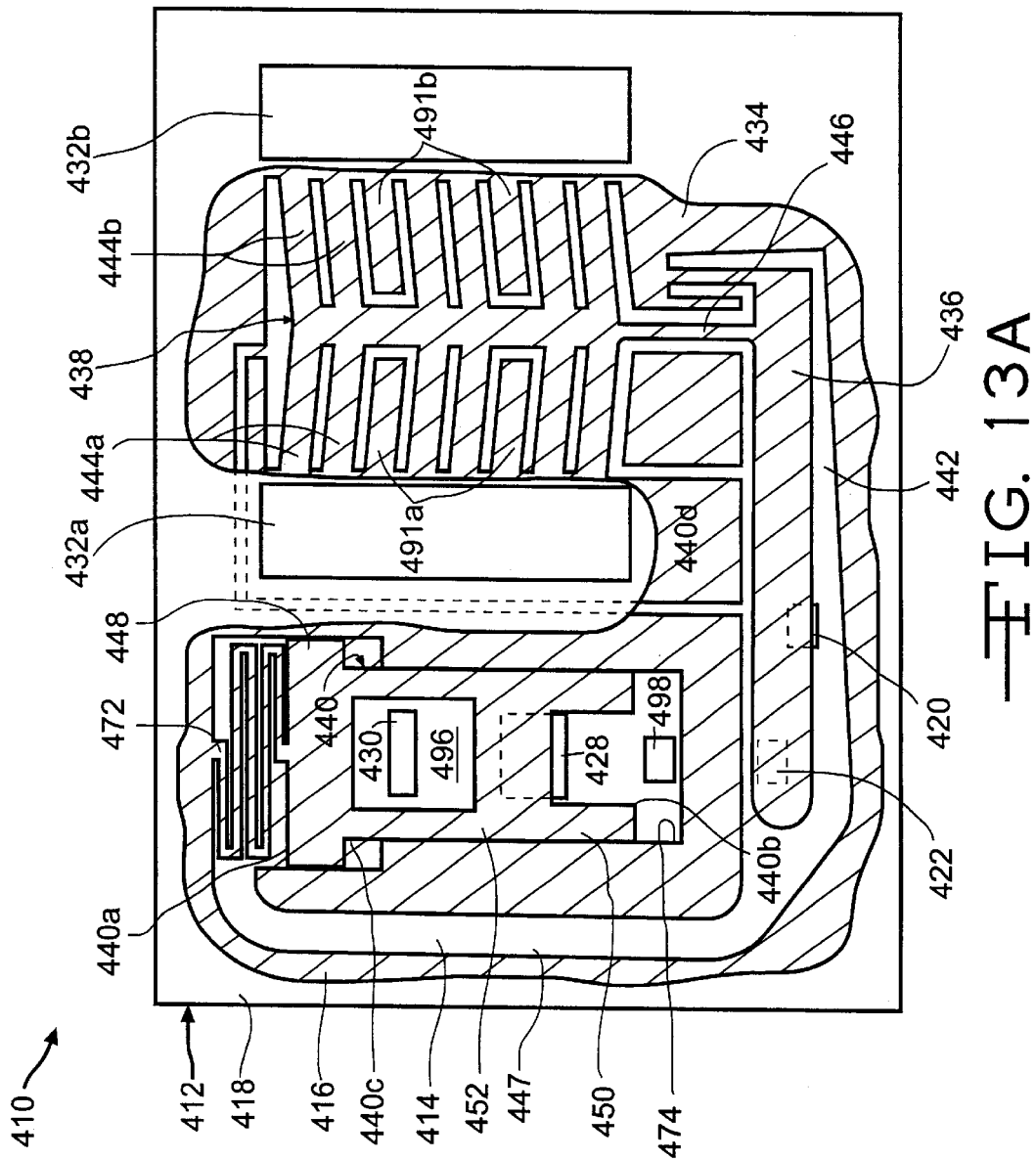
FIG. 13A is a top plan view of a fifth embodiment of a microvalve device according to this invention partly broken away to show the microvalve device in a first position.

A fifth embodiment of a microvalve device for controlling fluid flow in a fluid circuit is shown generally at 410 in FIG. 13A. The microvalve device 410 is similar in structure and function to the microvalve device 310, as such, similar 400 series and 300 series numbers indicate similar features. The primary difference between the microvalve device 410 and the microvalve device 310 is that slider valve 340 has been converted from a "two-port" valve to a "three-port" valve by adding a third primary port.

The microvalve device 410 includes a body 412. The body 412 includes a second plate 416 between and attached to a first plate 414 and a third plate 418.

The first plate 414 defines a first pilot port 420 and a second pilot port 422. The first plate further defines a first primary port 428, a second primary port 430 and a third primary port 498. Alternatively, any number of the ports 420, 422, 428, 430, 498 may be formed in the third plate 418. The first pilot port 420 is adapted for connection with a "low pressure" fluid source (not shown). The second pilot port 422 is adapted for connection with a "high pressure" fluid source (not shown). One of each of the primary ports 428, 430, 498 is adapted for connection to one of each of three different fluid sources (not shown). The fluid source associated with the third primary port 498 has a fluid pressure higher than the fluid pressure of the fluid source associated with the second primary port 430. Preferably, the fluid source associated with the first primary port 428 has a fluid pressure higher than the fluid pressure of the fluid source associated with the second primary port 430. Alternatively, the fluid source associated with the first primary port 428 may have a fluid pressure lower than the fluid pressure of the fluid source associated with the second primary port 430.

Figure 13B:
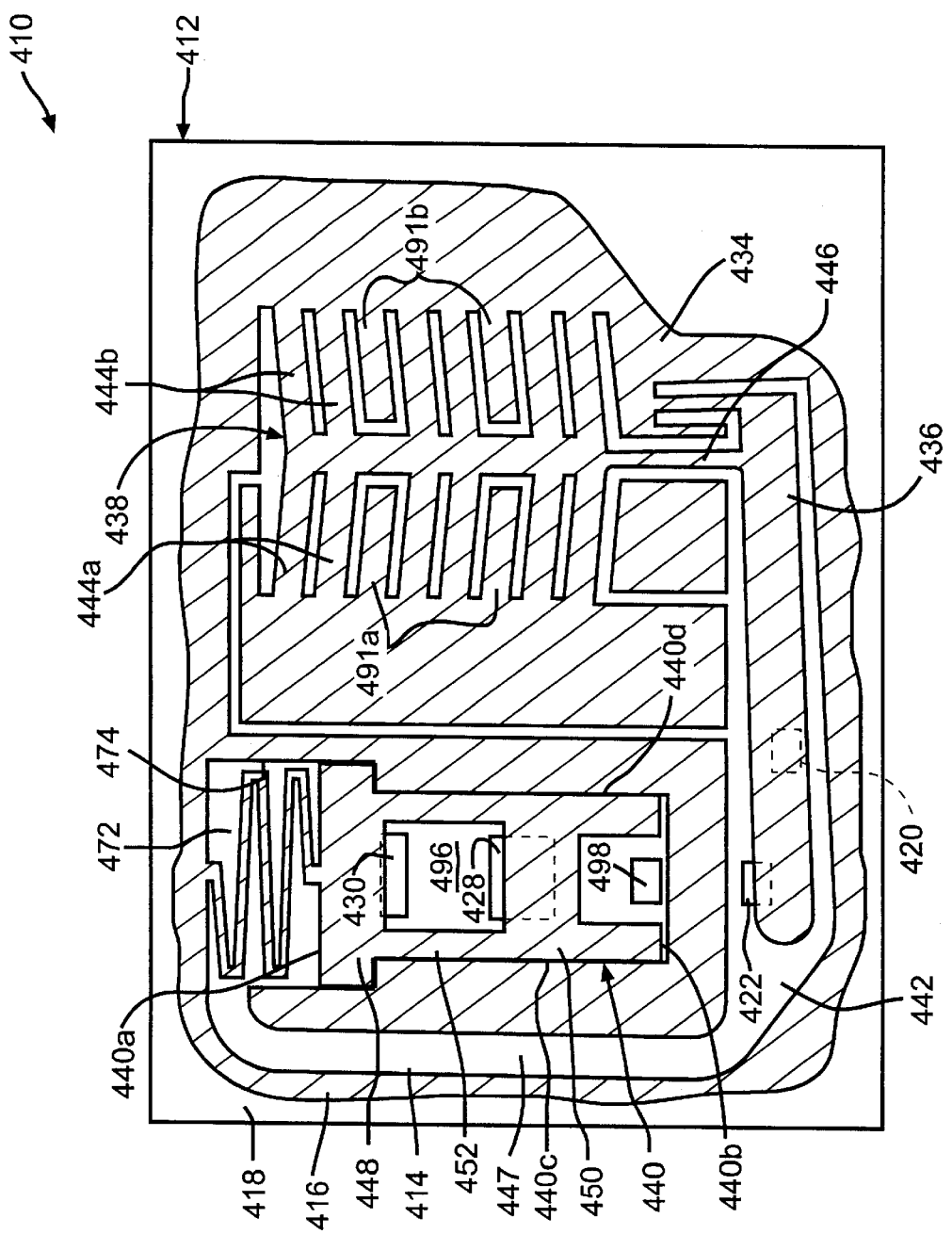
FIG. 13B is a view similar to FIG. 13A, except with the microvalve device shown in a second position.

Referring to FIGS. 13A and 13B, the second plate 416 includes a fixed portion 434 that defines a cavity 442. A pilot valve 436 extends from the fixed portion 434 and is movably disposed in the cavity 442 for movement between a first position (shown in FIG. 13A) and a second position (shown in FIG. 13B). In the first position, the pilot valve 436 blocks the second pilot port 422, which effectively blocks fluid communication between the passage 447 and the high pressure source associated with the second pilot port. Additionally, when in the first position, the pilot valve 436 unblocks the first pilot port 420. When the first pilot port 420 is unblocked fluid is allowed to flow between the passage 447 and the low pressure source associated with the first pilot port 420, which in turn allows the fluid pressure in the passage 447 to decrease. When moving to the second position, the pilot valve 436 increasingly unblocks the second pilot ports 422 and increasingly blocks the first pilot ports 420, which causes the fluid pressure in the passage 447 to increase. In the second position, the pilot valve 446 fully opens the second pilot port 420 and substantially closes the first pilot port 422, which allows the fluid pressure in the passage 447 to approach the fluid pressure of the high pressure source associated with the second pilot port 422.

An actuator 438 is operably coupled to the pilot valve 436 for moving the pilot valve 436 between the first and second positions. The actuator 438, like the actuator 38 is formed of at least one pair of ribs 44a and 44b arranged in a chevron to actuate a central spine 44. Periodically interposed between pairs of the ribs 444a and the ribs 44b are pressure-reinforcing members 491a and 491b, respectively. The pressure-reinforcing members 491a and 491b are similar in structure and function to the pressure-reinforcing members 191a and 191b of the microvalve device 110, described above.

The actuator 438 may be either controlled in a manner so as to control the movement of the pilot valve 436 in a two-positional operation mode or a proportional operation mode. When the pilot valve 436 operates in the two-positional operation mode, the pilot valve 436 acts as an on-off valve and is placed in a transient state when moving between the first and second positions. When the pilot valve 436 operates in the proportional operation mode, the pilot valve 436 may be held in any position between the first and second positions.

The second plate 416 further includes a slider valve 440 having opposite ends 440a and 440b and opposite sides 440c and 440d. The slider valve 440 is movably disposed in a sleeve 474, which defines a portion of the cavity 442, for movement between a first position (shown in FIG. 13A) and a second position (shown in FIG. 13B). As described above, when the pilot valve 436 operates in the proportional operation mode, the slider valve 440 may also be placed in any position between the first and second positions including an intermediate closed position in which the port 428 is effectively blocked by the slider valve 440 (not shown). The various positions of the slider valve 440 are further described below.

Figure 14:
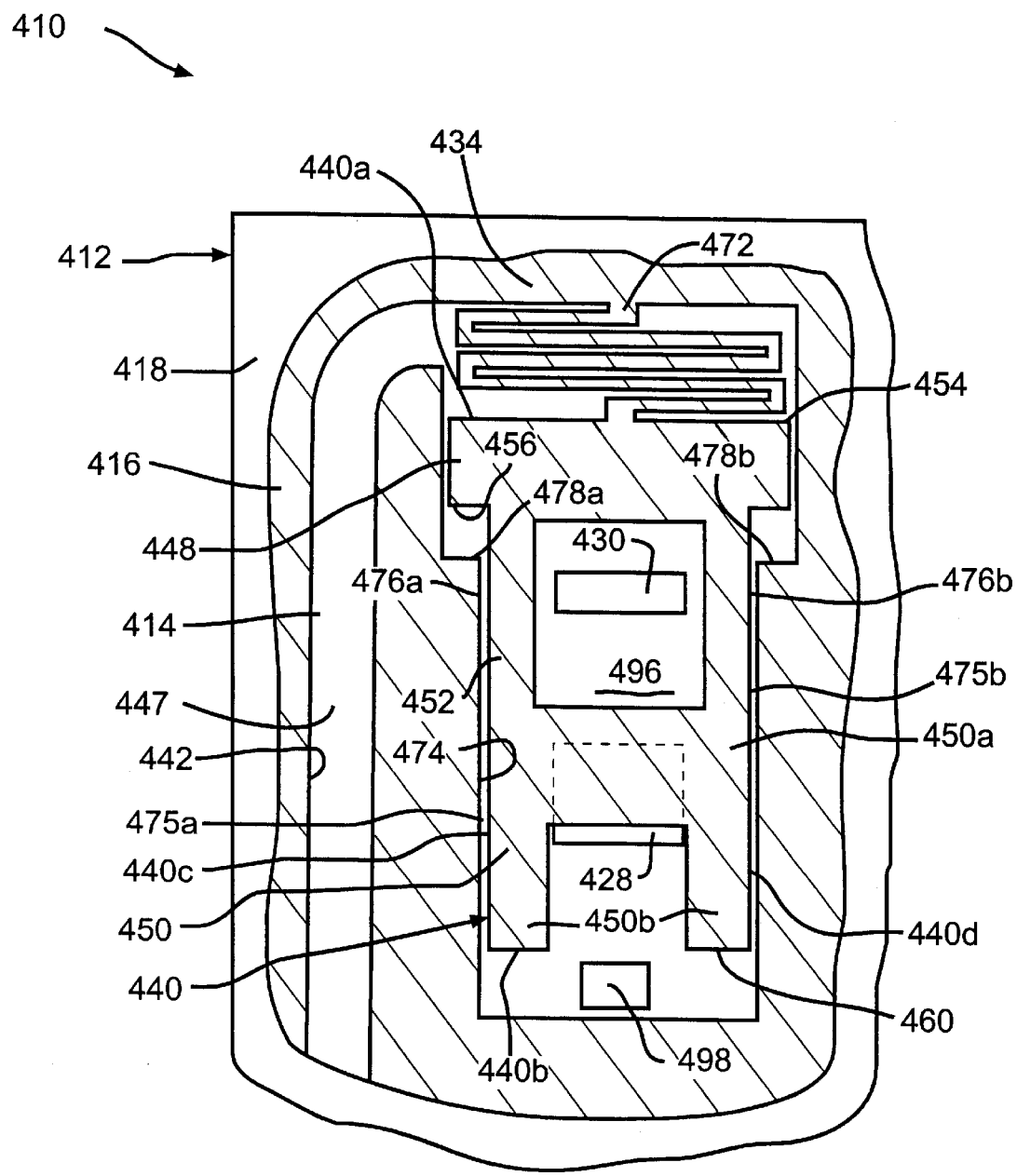
FIG. 14 is an enlarged view of a slider valve of the microvalve device illustrated in FIGS. 13A and 13B shown in the first position.

FIG. 14 is an enlargement of the slider valve 440 illustrated in the first position shown in FIG. 13A. The slider valve 440 includes a first portion 448 and a second portion 450 interconnected by an intermediate portion 452. The intermediate portion 452 defines a centrally located aperture 496 therethrough. The first portion 448 is wider than the intermediate portion 452 and has a first face 454 and a second face 456 opposite the first face 454. The first face 454 of the first portion 448 is at an end 440a of the slider valve 440. The end 440a of the slider valve 440 is placed in fluid communication with the first pilot port 420 when the pilot valve 436 is in the first position (as shown in FIG. 13A). The end 440a of the slider valve 440 is placed in fluid communication with the second pilot port 422 when the pilot valve 436 is in the second position (as shown in FIG. 13B). The end 440a of the slider valve 440 is placed in decreasing fluid communication with the first pilot port 420 and increasing fluid communication with the second pilot port 422 when the pilot valve 436 moves from the first position to the second position. Conversely, the end 440a of the slider valve 440 is placed in increasing fluid communication with the first pilot port 420 and decreasing fluid communication with the second pilot port 422 when the pilot valve 436 moves from the second position to the first position.

The second portion 450 has a squared U-shaped face 460 that defines the end 440b of the slider valve 440. The second portion 450 includes a blocking portion 450a extending from the intermediate portion 452. The blocking portion 450a is substantially the same width as the intermediate portion 452. A pair of longitudinal extensions 450b extend from the blocking portion 450a away from the intermediate portion 452. An outer edge of each extension 450b aligns with a side edge of the blocking portion 450a so as to extend the length of the gaps defined between the inner walls of the sleeve 474 and the respective sides 440c and 440d, thus increasing the restrictions presented by the leak paths through these gaps. The extensions 450b, thus, act to increase the head loss relating to fluid flow between the face 460 of the second portion 450 and the second face 456 of the first portion 448 so as to increase the pressure differential between fluid acting on the faces 460 and 456. It should be appreciated that in certain applications the extensions 450b may be eliminated if an adequate pressure differential can be otherwise maintained.

The slider valve 440 is aligned with the second primary port 430 such that the second primary port 430 is placed in constant fluid communication with the aperture 496. The slider valve 440 is aligned with the third primary port 498 such that the third primary port 498 is placed in constant fluid communication with the face 460 of the second portion 450. When the slider valve 440 is placed in the intermediate position, the blocking portion 450a completely covers and effectively blocks the first primary port 428. By completely covering the first primary port 428, the slider valve 440 effectively prevents fluid flow between any of the primary ports 428, 430, 498. When the slider valve 440 moves from the intermediate position to the first position, the blocking portion 450a unblocks an increasing portion of the first primary port 428 adjacent the face 460 of the second portion 450. By increasingly unblocking the portion of the first primary port 428 adjacent the face 460 of the second portion 450, the slider valve 440 places the first primary port 428 in increasing fluid communication with the third primary port 498 giving rise to increasing flow of fluid therebetween. When the slider valve 440 moves from the intermediate position to the second position, the blocking portion 450a unblocks an increasing portion of the first primary port 428 adjacent the aperture 496. By increasingly unblocking the portion of the first primary port 428 adjacent the aperture 496, the slider valve 440 places the first primary port 428 in increasing fluid communication with the second primary port 430 giving rise to increasing flow of fluid therebetween.

The second plate 416 further includes a tension spring 472 interconnecting the fixed portion 434 and the end 440a of the slider valve 440.

During use, when the pilot valve 436 is moved to the first position, pressure in the passage 447 is reduced, which in turn reduces the pressure acting on the face 454 of the slider valve. The slider valve 440 is then urged to move to the first position, shown in FIG. 13A, by the relatively high pressure maintained at the third primary port 498. When the pilot valve 436 is moved to the second position, pressure in the passage 447 is increased, which in turn increases the pressure acting on the face 454 of the slider valve 440. The force of the increased pressure acting on the relatively large area of the face 454 overcomes the force generated by the pressure acting on the relatively small area of the face 460 to move the slider valve 440 to the second position. In addition, when the pilot valve 436 operates in the proportional operation mode, the slider valve 440 may be moved and held in a position between the first and second position thereof by balancing of the fluid force acting on the first face 454 with net force of the fluid forces acting on the faces 456 and 460 and the force of the spring 472.

In a manner similar to that described relating to the microvalve device 10, the microvalve device 410 may be configured as normally positioned in either the first position or the second position.

The microvalve devices 10, 110, 210, 310 and 410 may be used in a variety of fluid control applications including anti-lock brake systems for automotive vehicles.

Figure 15A:
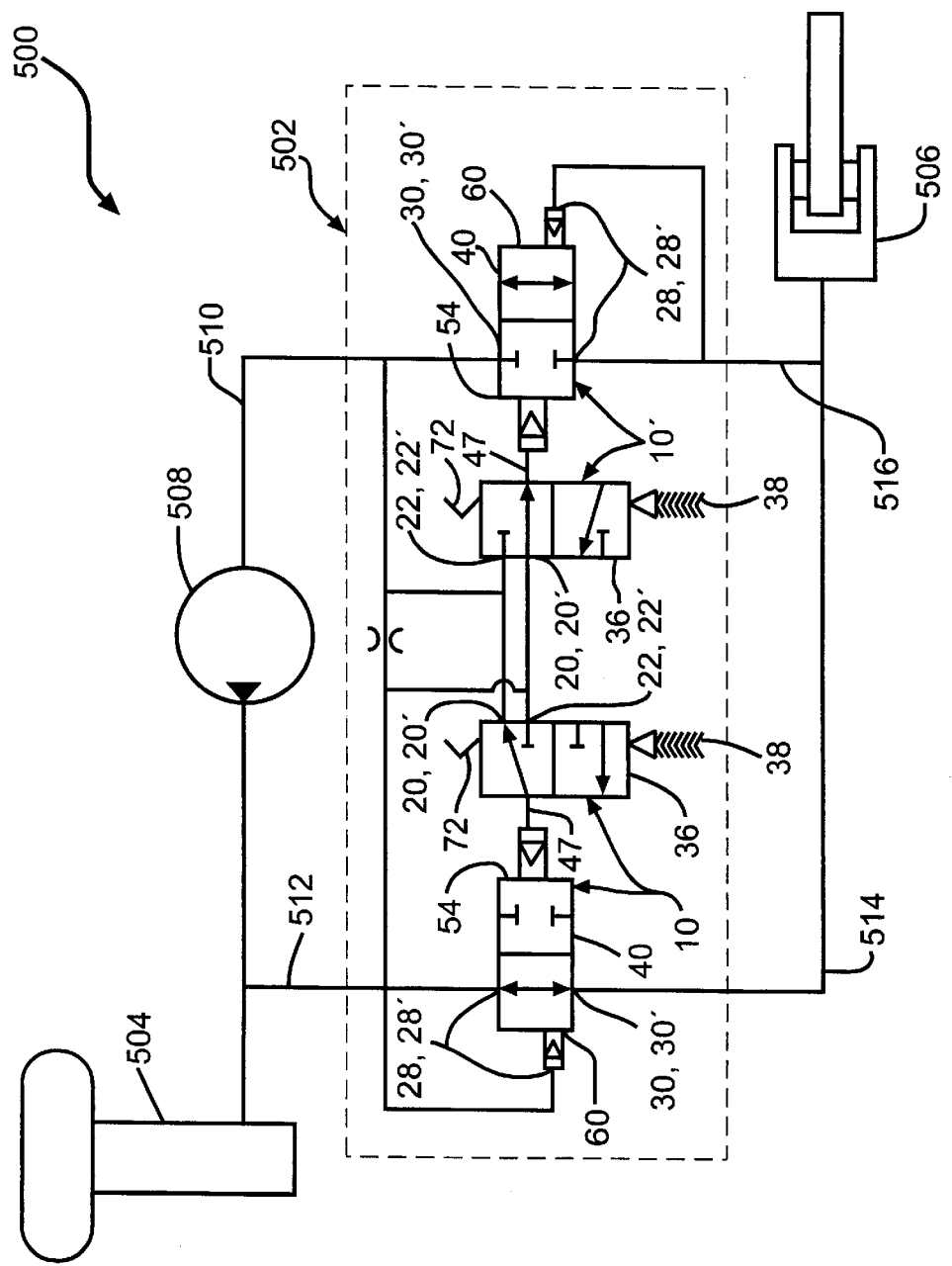
FIG. 15A is a schematic diagram of a first embodiment of a vehicular brake system including a microvalve unit having a normally open microvalve device and a normally closed microvalve device according to this invention shown in a normal operation mode.
Figure 15B:
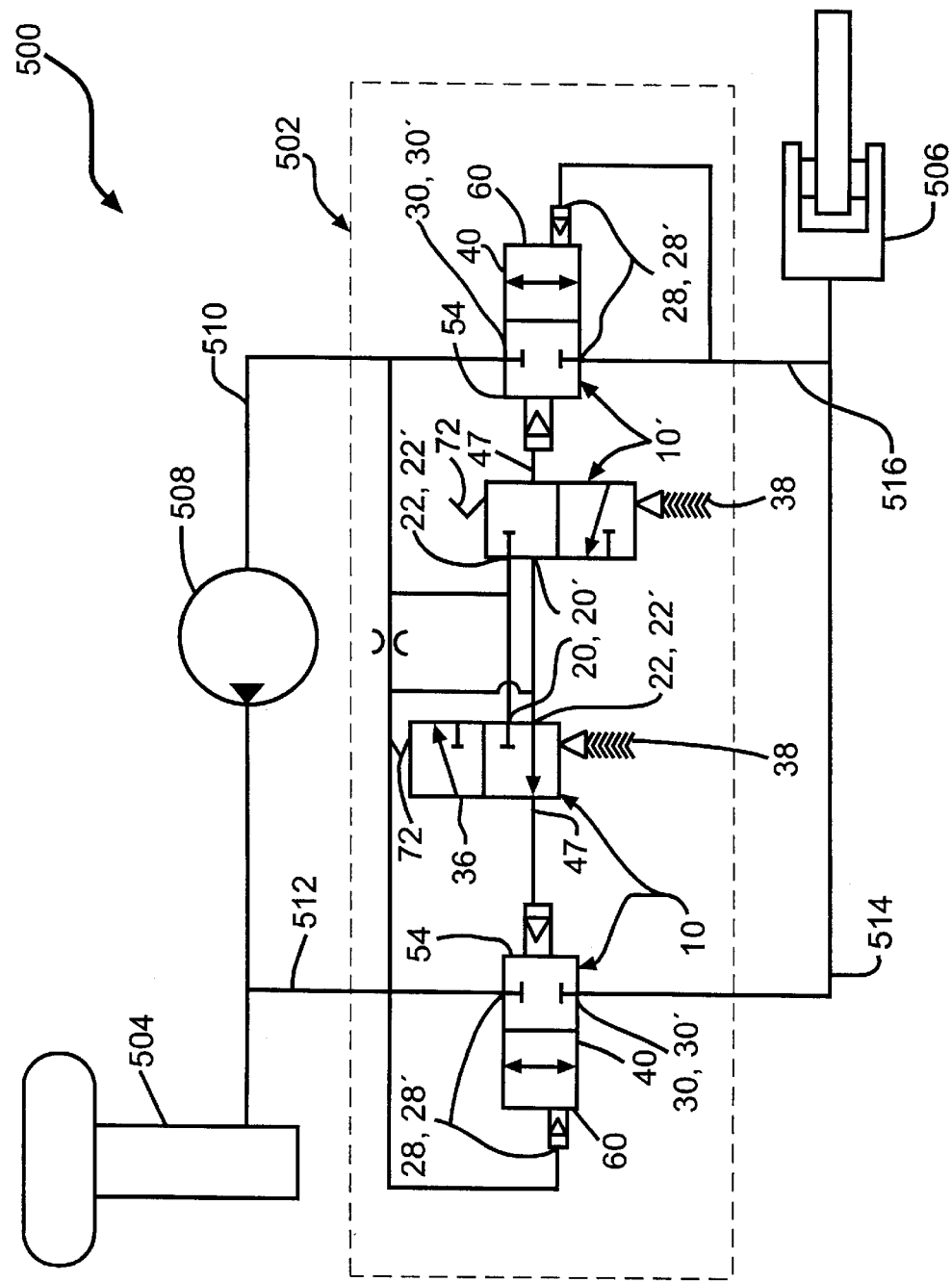
FIG. 15B is a schematic diagram similar to FIG. 15A, except showing the vehicular brake system in a dump operation mode.
Figure 15C:
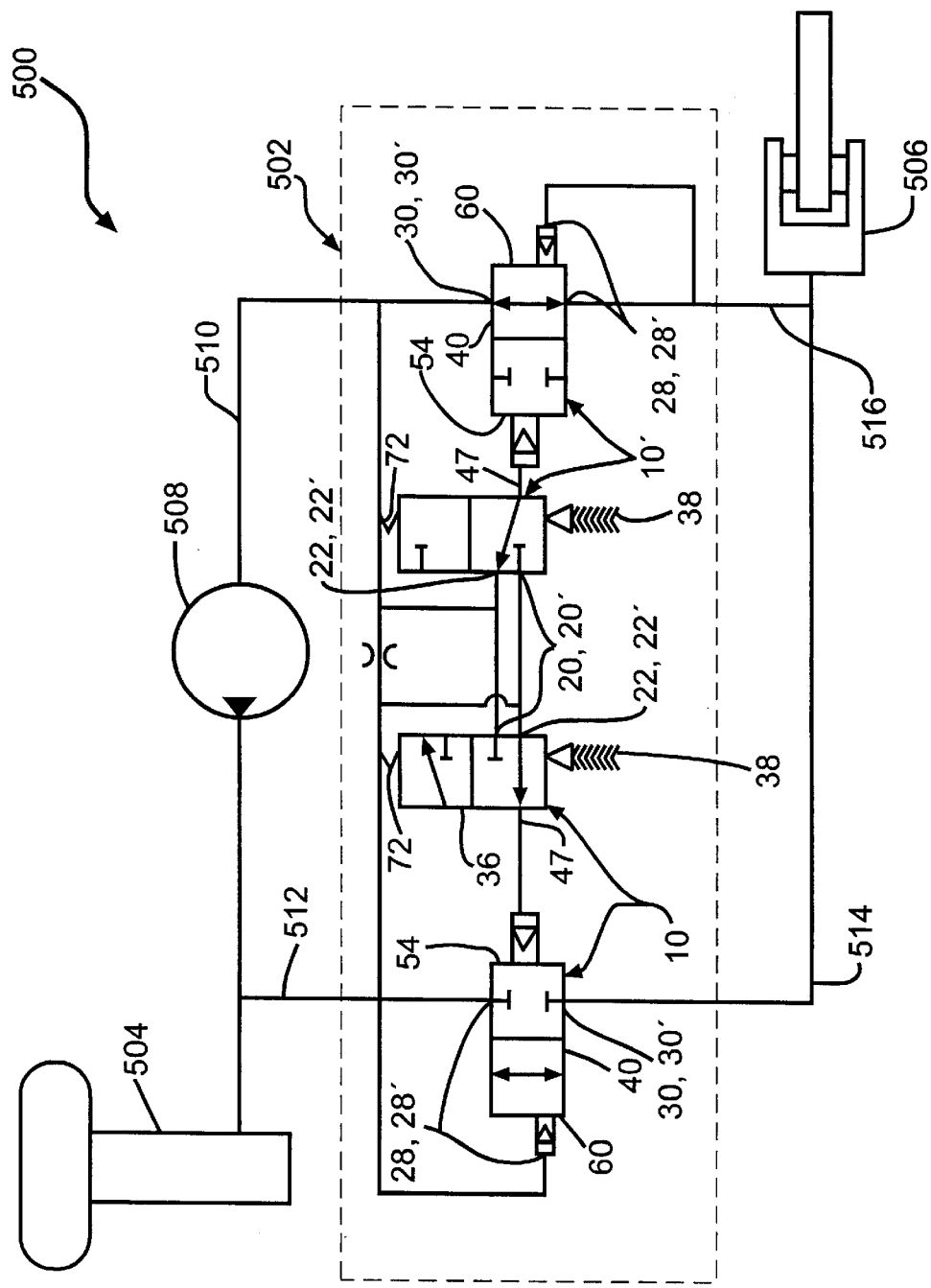
FIG. 15C is a schematic diagram similar to FIGS. 15A and 15B, except showing the vehicular brake system in a hold operation mode.

A first embodiment of a brake system for an automotive vehicle brake system incorporating a microvalve device of this invention is shown generally at 500 in FIGS. 15A, 15B and 15C. The brake system 500 includes a microvalve unit, indicated generally at 502, connected in fluid communication with a conventional master cylinder 504 and a conventional wheel brake 506 for controlling fluid flow between the master cylinder 504 and the wheel brake 506. A conventional pump 508 is connected in fluid communication with the microvalve unit 502 and the master cylinder 504 for transferring fluid to and from the wheel brake 506.

The brake system 500 as shown is configured to provide an anti-lock brake system (ABS) function. It is understood that other brake systems may include additional components. Such components may be placed in different fluid communication arrangements depending on the specified performance requirements and/or functions provided by the designated brake system.

The microvalve unit 502 includes the microvalve device 10 configured as a normally open valve for controlling fluid flow between the master cylinder 504 and the wheel brake 506. The microvalve unit 502 further includes a microvalve device 10' for controlling fluid flow from the wheel brake 506 to the pump 508. The microvalve device 10' is identical to the microvalve device 510, except for being configured as a normally closed valve.

It should be appreciated that any one of the microvalve devices 110, 210 and 310 configured as a normally open valve may replace the microvalve device 10 of the microvalve unit 502. Similarly, any one of the microvalve devices 110, 210 and 310 configured as a normally closed valve may replace the microvalve device 10' of the microvalve unit 502.

The first pilot ports 20, 20' of the microvalve device 10 and the second pilot ports 22, 22' of the microvalve device 10' are each connected in fluid communication with the inlet of the pump 508 via a conduit 510. The conduit 510, being connected to the inlet of the pump 508, acts a "low pressure" fluid source.

The second pilot ports 22, 22' of the microvalve device 10 and the first pilot ports 20, 20' of the microvalve device 10' are each connected in fluid communication with a conduit 512. The conduit 512 is connected in fluid communication with the master cylinder 504 and a discharge side or outlet of the pump 508. As such, during braking events, the conduit 512 acts as a "high pressure" fluid source with respect to the first faces 54 of the first portions 48 of the slider valves 40 of the microvalve devices 10, 10'.

The first primary ports 28, 28' of the microvalve device 10 are also connected to the conduit 512. As such, during braking events, the conduit 512 acts as a "high pressure" fluid source with respect to the second face 60 of the second portion 50 of the associated slider valve 40. The second primary ports 30, 30' of the microvalve device 10 are connected to the wheel brake 506 via a conduit 514. When the slider valve 40 of the microvalve device 10 is in the fully open position and the pressure of the fluid in conduit 512 is higher than the pressure of the fluid in conduit 514, fluid flows from the master cylinder 504 to the wheel brake 506. When the slider valve 40 of the microvalve device 10 is in the fully open position and the pressure of the fluid in conduit 512 is lower than the pressure of the fluid in conduit 514, fluid flows from the wheel brake 506 to the master cylinder 504. When the slider valve 40 of the microvalve device 10 is in the closed position, fluid flow between the master cylinder 504 and the wheel brake 506 is substantially prevented.

The first primary ports 28, 28' of the microvalve device 10' are connected to the wheel brake 506 via a conduit 516. As such, during braking events, the conduit 516 acts as a "high pressure" fluid source with respect to the second face 60 of the second portion 50 of the associated slider valve 40. The second primary ports 30, 30' of the microvalve device 10' are connected to the inlet of the pump via the conduit 510. When the slider valve 40 of the microvalve device 10' is in the open position fluid is allowed to flow from the wheel brake 506 to the inlet of the pump 508. When the slider valve 40 of the microvalve device 10' is in the closed position, fluid flow from the wheel brake 506 to the inlet of the pump 508 is substantially prevented.

Though not schematically represented, the exhaust ports 24, 24', 26, 26' of both of the microvalve devices 10 and 10' are connected the inlet of the pump 508 via conduit 510. As such, during non-braking events, the pressures of the fluid acting on each of the faces 54, 56, 58, 60 of the slider valve 40 are generally equal. Consequently, during non-braking events, slider valve 40 is biased by the spring 72 in the intermediate position.

The brake system 500 operates in one of three operating modes; including a normal mode, which is the mode of operation during non-ABS braking (foundation braking) and during ABS "apply mode" braking; a hold mode of ABS operation; and a dump mode of ABS operation.

FIG. 15A shows the brake system 500 in the normal mode. During the normal mode, the actuator 38 of the microvalve device 10 is de-energized. Accordingly, the associated pilot valve 36 is placed in the first position. By placing the pilot valve 36 of the microvalve device 10 in the first position, the first face 54 of the associated slider valve 40 is placed in fluid communication with the "low pressure" conduit 510. During braking events, the slider valve 40 of the microvalve device 10 is urged in the fully open position by the "high pressure" fluid of the conduit 512 acting on the associated second face 60. On the other hand, during non-braking events in which the pressure of the fluid in the conduit 512 is substantially equal to the pressure of the fluid in the conduit 510, the slider valve 40 of the microvalve device 10 is biased in the intermediate position by the associated spring 72. Having placed the slider valve 40 of the microvalve device 10 in either the fully open or the intermediate positions, fluid is allowed to flow between the master cylinder 504 and the wheel brake 506.

Also during the normal mode, the actuator 38 of the microvalve device 10' is de-energized. Accordingly, the associated pilot valve 36 is placed in the first position. By placing the pilot valve 36 of the microvalve device 10' in the first position, the first face 54 of the associated slider valve 40 is placed in fluid communication with the conduit 512. During events in which the conduit 512 acts as a "high pressure" fluid source, the slider valve 40 of the microvalve device 10' is urged in the closed position by the "high pressure" fluid acting on the first face 54 of the slider valve 40 of the microvalve device 10'. Having placed the slider valve 40 of the microvalve device 10' in the closed position, fluid is effectively prevented from flowing from the wheel brake 506 to the inlet of the pump 508. On the other hand, during non-braking events in which the pressure of the fluid in the conduit 516 is substantially equal to the pressure of the fluid in the conduit 510, the slider valve 40 of the microvalve device 10' is biased in the intermediate position by the associated spring 72.

FIG. 15B shows the brake system 500 in the hold mode of ABS operation. During the hold mode of ABS operation, the actuator 38 of the microvalve device 10' remains de-energized and conduit 512 acts as a "high pressure" fluid source. As described above, when the actuator 38 of the microvalve device 10' is de-energized and the conduit 512 acts as a "high pressure" fluid source, the associated slider valve 40 is placed in the closed position. As such, fluid is effectively prevented from flowing from the wheel brake 506 to the inlet of the pump 508.

Also during the hold mode of ABS operation, the actuator 38 of the microvalve device 10 is energized and the conduit 512 acts as a "high pressure" fluid source. By energizing the actuator 38 of the microvalve device 10, the associated pilot valve 36 is placed in the second position. By placing the pilot valve 36 of the microvalve device 10 in the second position, the first face 54 of the associated slider valve 40 is placed in fluid communication with the "high pressure" conduit 512. The "high pressure" fluid of the conduit 512 acting on the first face 54 of the associated slider valve 40 then urges the associated slider valve 40 to move to the closed position. Having placed the slider valve 40 of the microvalve device 10 is in the closed position, fluid is effectively prevented from flowing between the conduit 512 and the wheel brake 506. Thus, in the hold mode of ABS operation, the slider valves 40 of both the microvalve devices 10, 10' are placed in the closed positions. Having closed the slider valves 40 of both the microvalve device 10, 10', the wheel brake 506 is isolated from the remaining portion of the brake system 500 such that the fluid pressure of the wheel brake 506 is held substantially constant.

FIG. 15C shows the brake system 500 in the dump mode of ABS operation. During the dump mode, the actuator 38 of the microvalve device 10 is energized and the conduit 512 acts as a "high pressure" fluid source. As described above with respect to the hold mode of ABS operation, when the actuator 38 of the microvalve device 10 is energized and the conduit 512 acts as a "high pressure" fluid source, the slider valve 40 of the microvalve device 10 is placed in the closed position. Having placed the slider valve 40 of the microvalve device 10 in the closed position, fluid is effectively prevented from flowing between the conduit 512 and the wheel brake 506.

Also during the dump mode of ABS operation, the actuator 38 of the microvalve device 10' is energized. In turn, the associated pilot valve 36 is placed in the second position. By placing the pilot valve 36 of the microvalve device 10' in the second position, the first face 54 of the associated slider valve 40 is placed in fluid communication with the "high pressure" conduit 512. The "high pressure" fluid of the conduit 512 in turn urges the slider valve 40 of the microvalve device 10' to move to the fully open position. Having placed the slider valve 40 of the microvalve device 10' in the fully open position, fluid is allowed to flow from the wheel brake 506 to the inlet of the pump 508.

Figure 16A:
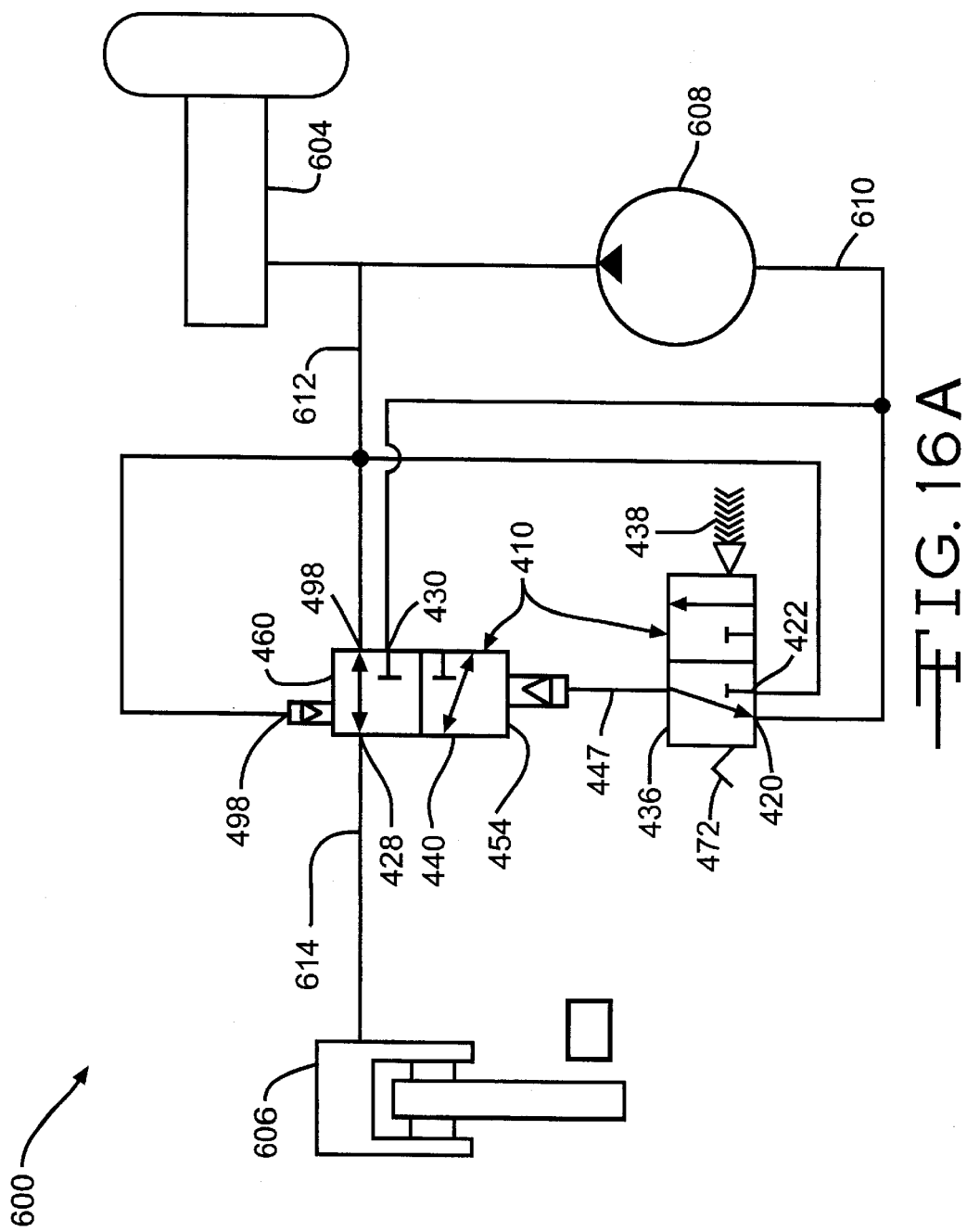
FIG. 16A is a schematic diagram of a second embodiment of a vehicular brake system including the microvalve device illustrated in FIGS. 13A and 13B configured as a two-position control valve shown in a normal operation mode.
Figure 16B:
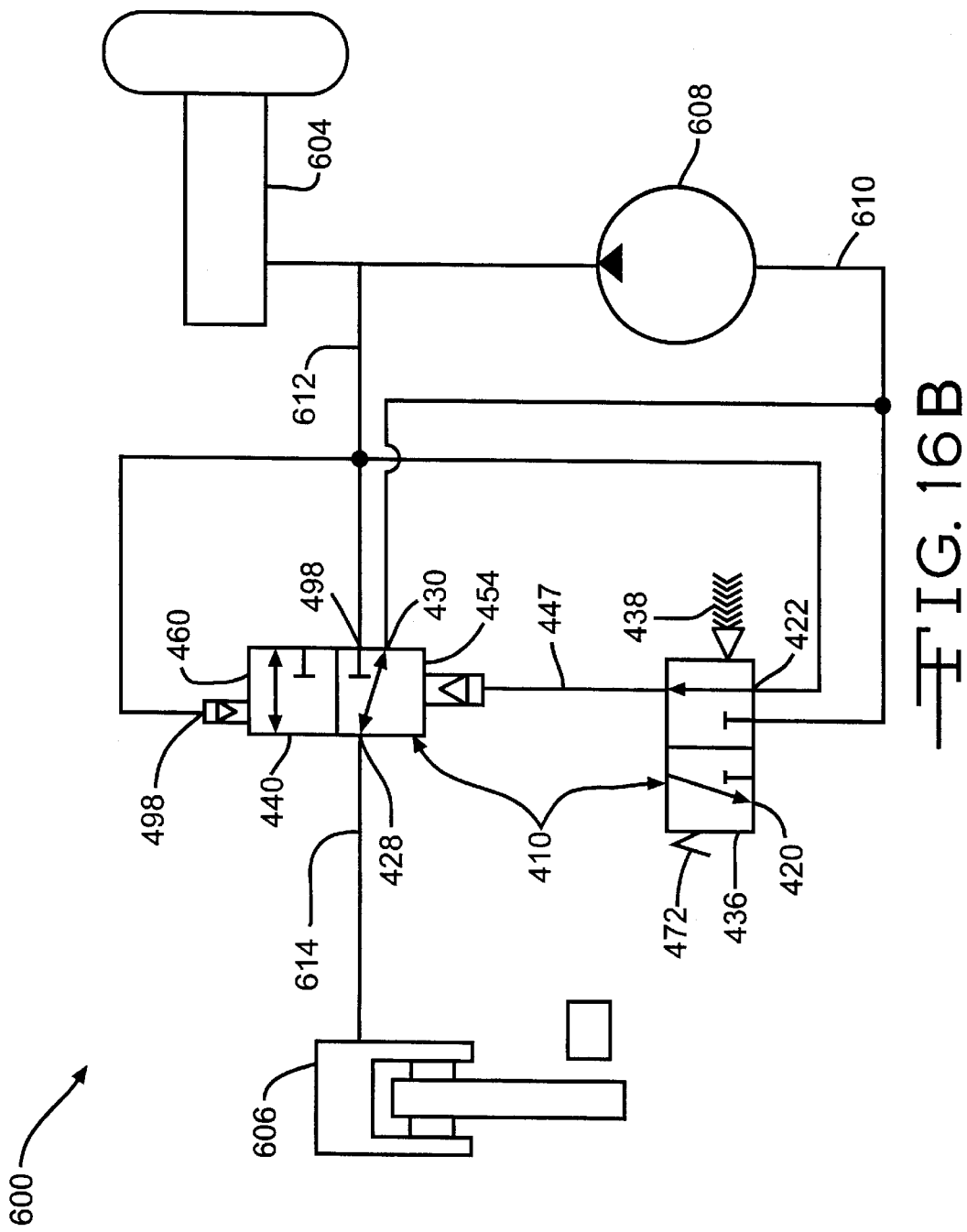
FIG. 16B is a schematic diagram similar to FIG. 16A, except showing the vehicular brake system in a dump operation mode.

A second embodiment of a brake system for an automotive vehicle incorporating this invention is shown generally at 600 in FIGS. 16A and 16B. The brake system 600 is similar in structure and in function to the brake system 500, as such, similar 600 series and 500 series numbers indicate similar features. The brake system 600 includes the microvalve device 410 configured as a two-position valve. The microvalve device 410 is connected in fluid communication with a conventional master cylinder 604 and a conventional wheel brake 606 for controlling fluid flow between the master cylinder 604 and the wheel brake 606. A conventional pump 608 is connected in fluid communication with the microvalve device 410 and the master cylinder 604 for transferring fluid to and from the wheel brake 606.

The brake system 600 as shown is configured to provide an anti-lock brake system (ABS) function. It is understood that other brake systems may include additional components. Such components may be placed in different fluid communication arrangements depending on the specified performance requirements and/or functions provided by the designated brake system.

The first pilot port 420 is connected in fluid communication with the inlet of the pump 608 via a conduit 610. The conduit 610, being connected to the inlet of the pump 608, acts a "low pressure" fluid source.

The second pilot port 422 is connected in fluid communication with a conduit 612. The conduit 612 is connected in fluid communication with the master cylinder 604 and a discharge side or outlet of the pump 608. As such, during braking events, the conduit 612 acts as a "high pressure" fluid source with respect to the first face 454 of the first portion 448 of the slider valve 440.

The third primary port 498 is also connected to the conduit 512. As such, during braking events, the conduit 612 acts as a "high pressure" fluid source with respect to the face 460 of the second portion 450 of the slider valve 440. The second primary port 430 is connected to the wheel brake 606 via a conduit 614. The first primary port 428 is connected to the conduit 610.

When the slider valve 440 is in the first position and the pressure of the fluid in conduit 612 is higher than the pressure of the fluid in conduit 614, fluid flows from the master cylinder 604 to the wheel brake 606. When the slider valve 440 is in the first position and the pressure of the fluid in conduit 612 is lower than the pressure of the fluid in conduit 614, fluid flows from the wheel brake 606 to the master cylinder 604. When the slider valve 440 is in the second position, fluid is allowed to flow between the wheel brake 606 and the inlet of the pump 608.

The brake system 600 operates in one of two operating modes including a normal mode and a dump mode. The normal mode is an operation mode during non-ABS braking (foundation braking) and during ABS "apply mode" braking. The dump mode is an operation mode during ABS operation.

FIG. 16A shows the brake system 600 in the normal mode. During the normal mode, the actuator 438 is de-energized. Accordingly, the associated pilot valve 436 is placed in the first position. By placing the associated pilot valve 436 in the first position, the first face 454 of the associated slider valve 440 is placed in fluid communication with the "low pressure" conduit 510. During braking events, the slider valve 440 is urged in the first position by the "high pressure" fluid of the conduit 612 acting on the face 460 of the slider valve 440. On the other hand, during non-braking events in which the pressure of the fluid in the conduit 612 is substantially equal to the pressure of the fluid in the conduit 610, the slider valve 40 is biased in an intermediate position by the spring 472. Preferably, the intermediate position represents a position nearly identical to the first position. Having placed the slider valve 440 in either the fully open or intermediate positions, fluid is allowed to flow between the master cylinder 604 and the wheel brake 606.

FIG. 16B shows the brake system 600 in the dump mode of ABS operation. During the dump mode, the actuator 438 is energized and the conduit 612 acts as a "high pressure" fluid source. In turn, the pilot valve 436 is placed in the second position. By placing the pilot valve 436 in the second position, the first face 454 of the slider valve 440 is placed in fluid communication with the "high pressure" conduit 612. The "high pressure" fluid of the conduit 612 acting on the first face 454 of the slider valve 440 in turn urges the slider valve 440 in to the second position. Having placed the slider valve 440 in the second position, fluid is allowed to flow from the wheel brake 606 to the inlet of the pump 608.

Figure 17:
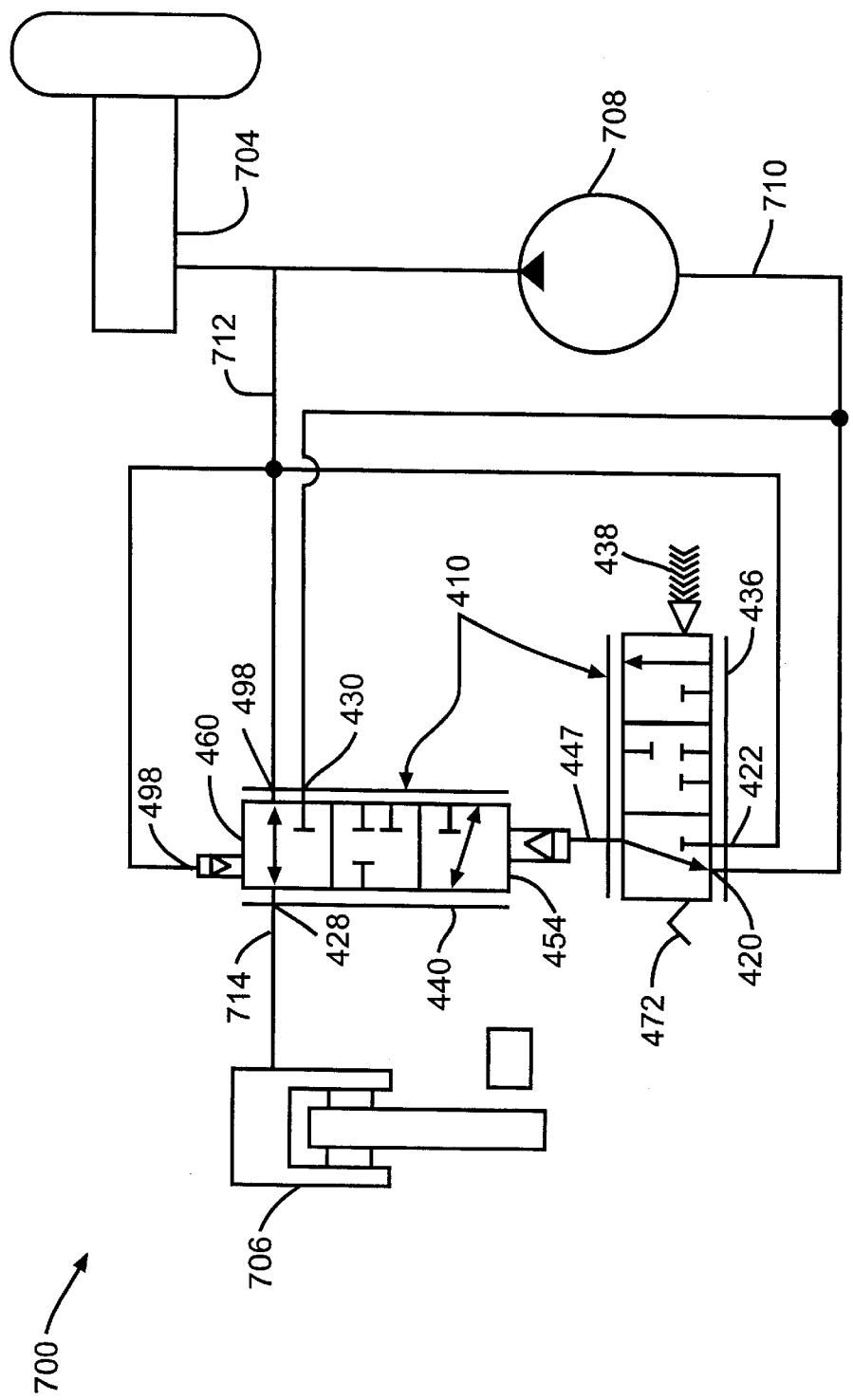
FIG. 17 is a schematic diagram of a third embodiment of a vehicular brake system including the microvalve device illustrated in FIGS. 13A and 13B configured as a proportional control valve shown in a normal operation mode.

A third embodiment of a brake system for an automotive vehicle incorporating this invention is shown generally at 700 in FIG. 17. The brake system 700 is similar in structure and in function to the brake system 600, as such, similar 700 series and 600 series numbers indicate similar features. The primary difference between the brake system 700 and the brake system 600 is that the microvalve device 410 has been configured as a proportional valve. As such, the actuator may move and hold the pilot valve 436 in positions between the first and second positions of the pilot valve 436. The placement of the pilot valve 436 in a position between the first and second positions causes the fluid acting on the first face 454 of slider valve 440 to assume a pressure having a valve between the pressures of the fluid sources associated with the pilot ports 420, 422. In turn, the net force acting on the slider valve 440 forces the slider valve 440 to move to a respective position between the first and second positions of the slider valve 440. Included in the positions between the first and second positions of the slider valve 440 is the intermediate position in which the first primary port 428 is completely covered by the blocking portion 450a. When the slider valve 440 is in the intermediate position, the wheel brake 706 is isolated from the remaining portion of the brake system 700 such that fluid flow to or from the wheel brake 506 is substantially prevented.

What is claimed is:

1. A microvalve actuator, comprising a body defining a generally planar first pressure boundary layer, a generally planar second pressure boundary layer, and at least one intermediate layer disposed between said first pressure boundary layer and said second pressure boundary layer, said at least one intermediate pressure boundary layer being sealingly fixed to said first pressure boundary layer and to said second pressure boundary layer, said intermediate pressure boundary layer defining stationary pressure boundary walls of a chamber bounded by said first pressure boundary layer, said second pressure boundary layer and said stationary pressure boundary walls of said at least one intermediate pressure boundary layer, said chamber containing an actuating member formed at least in part by said at least one intermediate pressure boundary for positioning a microvalve, said body further defining a pressure-reinforcing member extending between and being fixed to both said first pressure boundary layer and said second pressure boundary layer to resist movement of said first pressure boundary layer relatively away from said second pressure boundary layer if pressure in said chamber rises by reducing the surface areas of said first pressure boundary layer and said second pressure boundary layer that are continuously unsupported, said pressure-reinforcing member thus helping maintain the structural integrity of said body at a variety of pressures in said chamber.

2. The microvalve actuator defined in claim 1, wherein said body is comprised of at least three layers including first and second layers defining a portion of a pressure boundary for said chamber, said chamber having a fluid therein which is in fluid communication with a microvalve actuated by said microvalve actuator, said body further comprising a third layer disposed between and bonded to said first and second layers, said third layer defining a peripheral pressure boundary of said chamber between said first and second layers, said pressure-reinforcing member comprising a pressure-reinforcing post, spaced apart from said peripheral pressure boundary and fixing a portion of said first layer to a portion of said second layer.

3. The microvalve actuator defined in claim 2 wherein said pressure-reinforcing post is formed from one of said first, second, and third layers.

4. The microvalve defined in claim 1 wherein said actuator further comprises:

a movable spine;
a plurality of pairs of extensible ribs, each of said ribs having a first portion and a second portion, each pair of extensible ribs being fixed between said body and said spine with said ribs of each pair on being disposed opposite sides of the spine, each pair of ribs being longitudinally spaced along said spine, a first portion of one of said ribs and a first portion of a longitudinally adjacent rib defining a first gap therebetween, said first gap having a first gap distance; and
an extension body interposed between said second portion of said one of said ribs and said second portion of said longitudinally adjacent rib,
said extension body and said second portion of said one of said ribs defining a second gap between said extension body and said second portion of said one of said ribs, said second gap having a second gap distance equal to said first gap distance,
said extension body and said second portion of said longitudinally adjacent rib defining a third gap between said extension body and said longitudinally adjacent rib, said third gap having a third gap distance equal to said first gap distance.

5. The microvalve actuator defined in claim 4 wherein each of said first portions of said ribs defines a first width and each of said second portions of said ribs defines a second width less than said first width.

6. The microvalve actuator defined in claim 4 wherein said extension body is a generally laterally extending portion of said spine.

7. The microvalve actuator defined in claim 4 wherein said extension body is a generally laterally extending portion of said valve body.

8. The microvalve actuator defined in claim 4 wherein
said extension body is a generally laterally extending portion of said spine;

each of said ribs further defines a third portion; and said valve body defines a second extension body interposed between said third portion of said one of said ribs and said third portion of said longitudinally adjacent rib, said second extension body being a generally laterally extending portion of said valve body, said second extension body and said third portion of said one of said ribs defining a fourth gap between said second extension body and said third portion of said one of said ribs, said fourth gap having a fourth gap distance equal to said first gap distance, said second extension body and said third portion of said longitudinally adjacent rib defining a fifth gap between said second extension body and said longitudinally adjacent rib, said fifth gap having a fifth gap distance equal to said first gap distance.

9. The microvalve defined in claim 1 wherein said actuator further comprises:

a movable spine;

a plurality of pairs of extensible ribs, each of said ribs having a first portion and a second portion, each pair of extensible ribs being fixed between said body and said spine with said ribs of each pair on being disposed opposite sides of the spine, each pair of ribs being longitudinally spaced along said spine, a first portion of one of said ribs and a first portion of a longitudinally adjacent rib defining a first gap therebetween, said first gap having a first gap distance; and an extension body interposed between said second portion of said one of said ribs and said second portion of said longitudinally adjacent rib, said extension body and said second portion of said one of said ribs defining a second gap between said extension body and said second portion of said one of said ribs, said second gap having a second gap distance equal to said first gap distance, said extension body and said second portion of said longitudinally adjacent rib defining a third gap between said extension body and said longitudinally adjacent rib, said third gap having a third gap distance equal to said first gap distance.

10. The microvalve actuator defined in claim 1 further comprising a movable spine; and a plurality of pairs of extensible ribs, each pair of said ribs being fixed between said body and said spine with said ribs of each pair being disposed on opposite sides of the spine, each pair of ribs being longitudinally spaced along said spine;

wherein the pressure-reinforcing member is interposed between selected first longitudinally spaced ribs.

11. The microvalve actuator defined in claim 10 further comprising a second pressure-reinforcing member, wherein said second pressure-reinforcing member is interposed between selected second longitudinally spaced ribs.

12. The microvalve actuator defined in claim 1 wherein the pressure-reinforcing member is disposed in the chamber and adjacent said actuator.

13. A microvalve actuator, comprising a body defining stationary walls of a chamber, said body being comprised of at least three layers including first and second layers defining spaced-apart wall portions of a pressure boundary for said chamber, said chamber having a fluid therein which is in fluid communication with a microvalve actuated by a microvalve actuator contained in said chamber, said body further comprising a third layer disposed between and bonded to said first and second layers, said third layer defining a peripheral pressure boundary of said chamber between said first and second layers, said actuating member including a plurality of spaced apart pairs of ribs forming a plurality of chevrons fixed to a common central spine, said third layer defining a fixed body to which a plurality of said ribs are attached, a pressure-reinforcing member comprising a pressure-reinforcing peninsula extending from said fixed body to a region between two spaced-apart ribs of an adjacent pair of said chevrons, said pressure-reinforcing member being bonded to said first and second layers to fix a portion of said first layer to a portion of said second layer, said pressure-reinforcing member reinforcing the connections between the first and second layers by reducing the surface areas of the first and second layers that are continuously unsupported in the immediate vicinity of the ribs.

14. A micromechanical actuation device comprising:

a first layer, a second layer and a third layer, said third layer defining an actuator cavity and being disposed between said first and second layers;

a microvalve actuator disposed in said actuator cavity defined by said third layer; and a pressure reinforcing member disposed in said actuator cavity and fixed to said first and second layers.

15. The micromechanical actuation device defined in claim 14 wherein said microvalve actuator is thermally actuated.

* * * * *

UNITED STATES PATENT AND TRADEMARK OFFICE
CERTIFICATE OF CORRECTION

PATENT NO. : 6,845,962 B1
DATED : January 25, 2005
INVENTOR(S) : Richard J. Barron et al.

Page 1 of 1

It is certified that error appears in the above-identified patent and that said Letters Patent is hereby corrected as shown below:

<u>Title page,</u>
Item [75], Inventors, should read -- Richard J. Barron, Ann Arbor, MI (US); Kirt R. Williams, Portola Valley, CA (US) --

Signed and Sealed this

Seventh Day of June, 2005

JON W. DUDAS
*Director of the United States Patent and Trademark Office*